United States Patent
Miyake

(10) Patent No.: US 9,594,281 B2
(45) Date of Patent: Mar. 14, 2017

(54) LIQUID CRYSTAL DISPLAY DEVICE

(71) Applicant: Semiconductor Energy Laboratory Co., Ltd., Atsugi-shi, Kanagawa-ken (JP)

(72) Inventor: Hiroyuki Miyake, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 573 days.

(21) Appl. No.: 14/080,034

(22) Filed: Nov. 14, 2013

(65) Prior Publication Data

US 2014/0152932 A1 Jun. 5, 2014

(30) Foreign Application Priority Data

Nov. 30, 2012 (JP) ................. 2012-262538

(51) Int. Cl.
*G02F 1/1343* (2006.01)
*G02F 1/1362* (2006.01)
*G09G 3/36* (2006.01)

(52) U.S. Cl.
CPC ..... *G02F 1/136213* (2013.01); *G09G 3/3655* (2013.01); *G02F 2001/134372* (2013.01); *G09G 3/3614* (2013.01); *G09G 2300/0876* (2013.01)

(58) Field of Classification Search
CPC . G02F 1/13306; G02F 1/136213; G02F 1/133
(Continued)

(56) References Cited

U.S. PATENT DOCUMENTS

| | | |
|---|---|---|
| 5,534,884 A | 7/1996 | Mase et al. |
| 5,731,856 A | 3/1998 | Kim et al. |
| 5,744,864 A | 4/1998 | Cillessen et al. |
| 6,005,543 A | 12/1999 | Kimura |
| 6,052,103 A | 4/2000 | Fujiwara et al. |
| 6,166,714 A | 12/2000 | Kishimoto |
| 6,294,274 B1 | 9/2001 | Kawazoe et al. |
| 6,535,191 B1 | 3/2003 | Miyachi |
| 6,563,174 B2 | 5/2003 | Kawasaki et al. |
| 6,590,552 B1 | 7/2003 | Yokoyama et al. |
| 6,727,522 B1 | 4/2004 | Kawasaki et al. |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.

(Continued)

*Primary Examiner* — Lucy Chien
(74) *Attorney, Agent, or Firm* — Robinson Intellectual Property Law Office; Eric J. Robinson

(57) ABSTRACT

A liquid crystal display device preventing flicker. The liquid crystal display device includes a plurality of pixels each having a transistor, a liquid crystal element to which a first signal and a second signal having opposite polarities are alternately applied through the transistor, and a capacitor including a first electrode and a second electrode. The liquid crystal element includes a pixel electrode and a common electrode partly overlapping with each other with an insulating film interposed therebetween, and a liquid crystal layer over the pixel electrode and the common electrode. The first electrode of the capacitor is electrically connected to the pixel electrode. The potential of the second electrode changes between a first potential and a second potential having different levels after the first signal is applied until the second signal is applied, whereby a change in the voltage applied to the liquid crystal layer is reduced.

14 Claims, 22 Drawing Sheets

(58) Field of Classification Search
USPC .......................................................... 349/39
See application file for complete search history.

(56) References Cited

U.S. PATENT DOCUMENTS

| | | |
|---|---|---|
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,321,353 B2 | 1/2008 | Tsuda et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 2001/0024187 A1 | 9/2001 | Sato et al. |
| 2001/0046027 A1 | 11/2001 | Tai et al. |
| 2002/0056838 A1 | 5/2002 | Ogawa |
| 2002/0080131 A1 | 6/2002 | Fujino |
| 2002/0132454 A1 | 9/2002 | Ohtsu et al. |
| 2002/0180675 A1 | 12/2002 | Tobita et al. |
| 2003/0156104 A1 | 8/2003 | Morita |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0119755 A1 | 6/2006 | Senda et al. |
| 2006/0163583 A1 | 7/2006 | Jiroku |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0152921 A1 | 7/2007 | Osame |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0068516 A1* | 3/2008 | Mori ................... G09G 3/3648 348/790 |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0180385 A1* | 7/2008 | Yoshida ................ G09G 3/20 345/102 |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0284931 A1 | 11/2008 | Kimura |
| 2008/0296568 A1 | 12/2008 | Ryu et al. |
| 2009/0015533 A1 | 1/2009 | Fujita et al. |
| 2009/0068773 A1 | 3/2009 | Lai et al. |
| 2009/0072226 A1 | 3/2009 | Koo et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2009/0310077 A1 | 12/2009 | Kim et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0214272 A1 | 8/2010 | Watsuda |
| 2011/0157131 A1 | 6/2011 | Miyake |
| 2011/0181581 A1* | 7/2011 | Saito ................... G09G 3/344 345/212 |
| 2014/0146033 A1 | 5/2014 | Koyama et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2007-096055 A | 4/2007 |
| JP | 2007-123861 A | 5/2007 |
| WO | WO-2004/114391 | 12/2004 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

(56) References Cited

OTHER PUBLICATIONS

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.
Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.
Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.
Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.
Prins.M et al., "A Ferroelectric Transparent Thin-Film Transistor,", Appl. Phys. Lett. (Applied Physics Letters), Jun. 17, 1996, vol. 68, No. 25, pp. 3650-3652.
Nakamura.M et al., "The phase relations in the In2O3—Ga2ZnO4—ZnO system at 1350° C,", Journal of Solid State Chemistry, Aug. 1, 1991, vol. 93, No. 2, pp. 298-315.
Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System,", Journal of Solid State Chemistry, Apr. 1, 1995, vol. 116, No. 1, pp. 170-178.
Nomura.K et al., "Thin-Film Transistor Fabricated in Single-Crystalline Transparent Oxide Semiconductor,", Science, May 23, 2003, vol. 300, No. 5623, pp. 1269-1272.
Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.
Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.
Osada.T et al., "15.2: Development of Driver-Integrated Panel using Amorphous In—Ga—Zn-Oxide TFT,", SID Digest '09 : SID International Symposium Digest of Technical Papers, May 31, 2009, pp. 184-187.
Nomura.K et al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.
Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.
Son.K et al., "42.4L: Late-News Paper: 4 Inch QVGA AMOLED Driven by the Threshold Voltage Controlled Amorphous GIZO (Ga2O3—In2O3—ZnO) TFT,", SID Digest '08 : SID International Symposium Digest of Technical Papers, May 20, 2008, vol. 39, pp. 633-636.
Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.
Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.
Kanno.H et al., "White Stacked Electrophosphorecent Organic Light-Emitting Devices Employing MoO3 as a Charge-Generation Layer,", Adv. Mater. (Advanced Materials), 2006, vol. 18, No. 3, pp. 339-342.
Tsuda.K et al., "Ultra Low Power Consumption Technologies for Mobile TFT-LCDs ,", IDW '02 : Proceedings of the 9th International Display Workshops, Dec. 4, 2002, pp. 295-298.
Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.
Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technical Papers, May 20, 2008, vol. 39, No. 1, pp. 1-4.
Park.J et al., "High performance amorphous oxide thin film transistors with self-aligned top-gate structure,", IEDM 09: Technical Digest of International Electron Devices Meeting, Dec. 7, 2009, pp. 191-194.
Kurokawa.Y et al., "UHF RFCPUS on Flexible and Glass Substrates for Secure RFID Systems,", Journal of Solid-State Circuits , 2008, vol. 43, No. 1, pp. 292-299.
Ohara.H et al., "Amorphous In—Ga—Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.
Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.
Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.
Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.
Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.
Sakata.J et al., "Development of 4.0-In. AMOLED Display With Driver Circuit Using Amorphous In—Ga—Zn-Oxide TFTs,", IDW '09 : Proceedings of the 16th International Display Workshops, 2009, pp. 689-692.
Park.J et al., "Amorphous Indium-Gallium-Zinc Oxide TFTs and Their Application for Large Size AMOLED,", AM-FPD '08 Digest of Technical Papers, Jul. 2, 2008, pp. 275-278.
Park.S et al., "Challenge to Future Displays: Transparent AM-OLED Driven by PEALD Grown ZnO TFT,", IMID '07 Digest, 2007, pp. 1249-1252.
Godo.H et al., "Temperature Dependence of Characteristics and Electronic Structure for Amorphous In—Ga—Zn-Oxide TFT,", AM-FPD '09 Digest of Technical Papers, Jul. 1, 2009, pp. 41-44.
Osada.T et al., "Development of Driver-Integrated Panel Using Amorphous In—Ga—Zn-Oxide TFT,", AM-FPD '09 Digest of Technical Papers, Jul. 1, 2009, pp. 33-36.
Hirao.T et al., "Novel Top-Gate Zinc Oxide Thin-Film Transistors (ZnO TFTs) for AMLCDs,", Journal of the SID, 2007, vol. 15, No. 1, pp. 17-22.
Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.
Godo.H et al., "P-9:Numerical Analysis on Temperature Dependence of Characteristics of Amorphous In—Ga—Zn-Oxide TFT,", SID Digest '09 : SID International Symposium Digest of Technical Papers, May 31, 2009, pp. 1110-1112.
Ohara.H et al., "21.3:4.0 In. QVGA AMOLED Display Using In—Ga—Zn-Oxide TFTs With a Novel Passivation Layer,", SID Digest '09 : SID International Symposium Digest of Technical Papers, May 31, 2009, pp. 284-287.
Miyasaka.M, "SUFTLA Flexible Microelectronics on Their Way to Business,", SID Digest '07 : SID International Symposium Digest of Technical Papers, 2007, vol. 38, pp. 1673-1676.
Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

(56) References Cited

OTHER PUBLICATIONS

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1: Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YbFe2O4, and Yb2Fe3O7 Types of Structures for Compounds in the In2O3 and SC2O3—A2O3—BO Systems [A; Fe, Ga, or Al; B: Mg, Mn, Fe, Ni, Cu,or Zn] at Temperatures over 1000° C,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review, B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clarks et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

Amano.S et al., "Low Power LC Display Using In—Ga—Zn-Oxide TFTs Based on Variable Frame Frequency,", SID Digest '10 : SID International Symposium Digest of Technical Papers, 2010, pp. 626-629.

Nishi.T et al., "P-143: Possibility of Reflective LC Display Using Oxide Semiconductor TFTs as Electronic Paper Display,", SID Digest '10 : SID International Symposium Digest of Technical Papers, May 1, 2010, vol. 41, No. 1, pp. 1685-1688.

Godo.H et al., "Modeling and Measurement of Ultra-Low Leakage Current of IGZO TFTs and New Driving Methods of LCDs,", IDW '10 : Proceedings of the 16th International Display Workshops, 2010, pp. 235-238.

\* cited by examiner

LIQUID CRYSTAL DISPLAY DEVICE

BACKGROUND OF THE INVENTION

1. Field of the Invention

The present invention relates to a semiconductor device. In particular, the present invention relates to an active matrix liquid crystal display device.

2. Description of the Related Art

As a novel semiconductor combining high mobility of crystalline silicon with uniform element characteristics of amorphous silicon, a metal oxide with semiconductor properties, which is called an oxide semiconductor, has attracted attention. The metal oxide is used for various applications; for example, a well-known metal oxide, indium oxide is used for a light-transmitting pixel electrode in a liquid crystal display device, a light-emitting device, or the like. Examples of the metal oxides with semiconductor properties include tungsten oxide, tin oxide, indium oxide, and zinc oxide. It has already been known that such a metal oxide with semiconductor properties is used for a channel formation of a transistor (Patent Documents 1 and 2).

REFERENCES

Patent Documents

[Patent Document 1] Japanese Published Patent Application No. 2007-123861

[Patent Document 2] Japanese Published Patent Application No. 2007-96055

SUMMARY OF THE INVENTION

Low power consumption is one of the key points in evaluating the performance of a semiconductor display device, and a liquid crystal display device is no exception in this regard. Particularly when used for portable electronic devices such as cellular phones, the liquid crystal display device definitely needs to have low power consumption because an increase in the power consumption of the liquid crystal display device causes a reduction in continuous operation time.

In view of the above technical background, an object of one embodiment of the present invention is to provide a liquid crystal display device with low power consumption.

In a liquid crystal display device of one embodiment of the present invention, an insulated-gate field-effect transistor (hereinafter, simply referred to as a transistor) with extremely low off-state current is provided in a pixel in order to keep display of images on a pixel portion after the writing of image signals to the pixel portion is stopped. By using the above transistor as an element for controlling the supply of voltage to a liquid crystal element included in the pixel, the voltage applied to the liquid crystal element can be held for a long time. Thus, for example, in the case where image signals having the same image data are repeatedly written to the pixel portion during continuous frame periods as in the case of displaying a still image, the displayed image can be maintained even when the driving frequency is lowered by temporarily stopping the writing of image signals to the pixel portion, that is, even when the number of times of writing of image signals in a certain period is reduced.

Further, a liquid crystal display device of one embodiment of the present invention includes a liquid crystal element which includes a pixel electrode and a common electrode that partly overlap with each other with an insulating film interposed therebetween, and a liquid crystal layer to which an electric field is applied from the pixel electrode and the common electrode. A pixel includes a capacitor in addition to a transistor and the liquid crystal element. A first electrode of the capacitor is electrically connected to the pixel electrode. After an image signal having a first polarity is written to the pixel, the potential of a second electrode of the capacitor changes between a first potential and a second potential which have different levels until an image signal having a second polarity is written to the pixel.

One embodiment of the present invention allows a liquid crystal display device with low power consumption to be provided.

DETAILED DESCRIPTION OF THE INVENTION

Hereinafter, embodiments of the present invention will be described in detail with reference to the accompanying drawings. Note that the present invention is not limited to the following description and it is easily understood by those skilled in the art that the mode and details can be variously changed without departing from the scope and spirit of the present invention. Accordingly, the present invention should not be construed as being limited to the description of the embodiments below.

Note that in this specification, a panel in which liquid crystal elements are formed in respective pixels, and a module in which an IC or the like including a driver circuit or a controller is mounted on the panel fall into the category of a liquid crystal display device. Further, an element substrate corresponding to one mode before a liquid crystal element is completed in a manufacturing process of a liquid crystal display device falls into the category of the liquid crystal display device of one embodiment of the present invention. In the element substrate, each of a plurality of pixels is provided with a transistor, a pixel electrode and a common electrode which are used for a liquid crystal element, and a capacitor.

In addition, the liquid crystal display device of one embodiment of the present invention may include a touch panel which is a position input device capable of detecting a position pointed at with a finger, a stylus, or the like and generating a signal including the positional information.

<Example of Structure of Pixel>

Figure 1A:
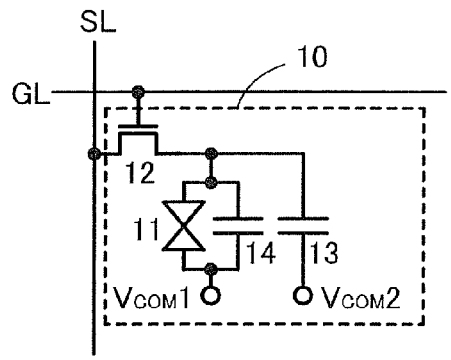
FIG. 1A illustrates a structure of a pixel.

FIG. 1A illustrates an example of a structure of a pixel included in the liquid crystal display device of one embodiment of the present invention. A pixel 10 illustrated in FIG. 1A includes a liquid crystal element 11, a transistor 12 controlling the supply of an image signal to the liquid crystal element 11, and a capacitor 13.

The liquid crystal element 11 includes a pixel electrode, a common electrode, and a liquid crystal layer which contains a liquid crystal material and to which a voltage is applied across the pixel electrode and the common electrode. FIG. 1A illustrates a fringe field switching (FFS) mode liquid crystal element 11, in which case the pixel electrode and the common electrode partly overlap with each other with an insulating film interposed therebetween. This overlapping area serves as a capacitor for holding a voltage $V_{LC}$ applied between the pixel electrode and the common electrode. Such a capacitor is denoted as a capacitor 14 in FIG. 1A.

The transistor 12 controls whether the potential of an image signal input to a wiring SL is applied to the pixel electrode of the liquid crystal element 11. A predetermined reference potential $V_{COM}1$ is applied to the common electrode of the liquid crystal element 11.

Hereinafter, the connection relationship among the liquid crystal element 11, the transistor 12, and the capacitor 13 will be described in detail.

Note that in this specification, the term "connection" means electrical connection and corresponds to a state in which a current, a voltage, or a potential can be supplied or transmitted. Therefore, a state of being "connected" means not only a state of direct connection but also a state of indirect connection through an element such as a wiring, a resistor, a diode, or a transistor so that a current, a voltage, or a potential can be supplied or transmitted.

In addition, even when different components are connected to each other in a circuit diagram, there is actually a case where one conductive film has functions of a plurality of components, for example, a case where part of a wiring serves as an electrode. In this specification, the term "connection" also means such a case where one conductive film has functions of a plurality of components.

The terms "source" and "drain" of a transistor interchange with each other depending on the type of the channel of the transistor or levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, the connection relation of the transistor is described in some cases assuming that the source and the drain are fixed for convenience; actually, the names of the source and the drain interchange with each other depending on the relation of the potentials.

A source of a transistor means a source region that is part of a semiconductor film functioning as an active layer or a source electrode that is connected to the semiconductor film. Similarly, a drain of a transistor means a drain region that is part of the semiconductor film or a drain electrode that is connected to the semiconductor film. A gate means a gate electrode.

In the pixel 10 illustrated in FIG. 1A, a gate of the transistor 12 is electrically connected to a wiring GL. One of a source and a drain of the transistor 12 is connected to the wiring SL, and the other of the source and the drain of the transistor 12 is connected to the pixel electrode of the liquid crystal element 11. The capacitor 13 includes a pair of electrodes: one electrode is electrically connected to the pixel electrode of the liquid crystal element 11, and a predetermined potential $V_{COM}2$ is applied to the other electrode.

Note that the pixel 10 may further include another circuit element such as a transistor, a diode, a resistor, a capacitor, or an inductor as needed.

FIG. 1A shows an example in which one transistor 12 is used as a switch for controlling the input of an image signal to the pixel 10. Alternatively, the pixel 10 may include a plurality of transistors functioning as one switch. In the case where a plurality of transistors function as a switch, they may be connected in parallel, in series, or in combination of parallel connection and series connection.

Note that in this specification, a state in which transistors are connected to each other in series means, for example, a state in which only one of a source and a drain of a first transistor is connected to only one of a source and a drain of a second transistor. In addition, a state in which transistors are connected to each other in parallel means a state in which one of a source and a drain of a first transistor is connected to one of a source and a drain of a second transistor and the other of the source and the drain of the first transistor is connected to the other of the source and the drain of the second transistor.

In one embodiment of the present invention, the transistor 12 has an extremely low off-state current, so that the voltage applied to the liquid crystal element 11 can be held for a long time. Thus, for example, in the case where image signals having the same image data are written to the pixel 10 during continuous frame periods as in the case of displaying a still image, the displayed gray scale can be maintained even when the driving frequency is lowered, that is, even when the number of times of writing of image signals to the pixel 10 in a certain period is reduced. For example, by using a highly purified oxide semiconductor for a channel formation region of the transistor 12, the interval between writings of image signals can be made longer than or equal to 10 seconds, preferably longer than or equal to 30 seconds, and more preferably longer than or equal to one minute. An increase in the interval between writings of image signals results in a reduction in power consumption.

By performing inversion driving, in which the polarity of the potential of an image signal is inverted on the basis of the potential $V_{COM}1$ of the common electrode, degradation of a liquid crystal material called burn-in can be prevented. However, in the inversion driving, a change in the potential applied to the wiring SL is increased at the time of the change in the polarity of the image signal; thus, a potential difference between the source and the drain of the transistor 12 serving as a switch is increased. Accordingly, deterioration in characteristics such as a shift in threshold voltage is easily caused in the transistor 12. In particular, in the case of a horizontal electric field mode liquid crystal display device, such as an FFS mode liquid crystal display device as shown in one embodiment of the present invention, a potential difference between an image signal having a positive polarity and an image signal having a negative polarity tends to be larger than that in another mode liquid crystal display device. For example, in the case where a liquid crystal layer includes a TN liquid crystal, the potential difference is about ten volts; in the case where the liquid crystal layer includes a liquid crystal exhibiting a blue phase, the potential difference is as large as several tens of volts. Therefore, in the case of the horizontal electric field mode liquid crystal display device, the potential difference increases and deterioration in the electrical characteristics of the transistor 12 is highly likely to occur. Further, in order to maintain the voltage held in the liquid crystal element 11, the off-state current of the transistor 12 needs to be low even when the potential difference between the source and the drain is large. When a semiconductor having a wider bandgap and lower intrinsic carrier density than silicon or germanium, such as an oxide semiconductor, is used for the transistor 12, the withstand voltage of the transistor 12 can be increased and the off-state current can be made extremely low. Thus, as compared to the case where a transistor including a normal semiconductor such as silicon or germanium is used, degradation of the transistor 12 can be prevented and the voltage held in the liquid crystal element 11 can be maintained.

Note that even when a small amount of charge is leaked through the transistor 12, the electric field applied to the liquid crystal layer might vary depending on some factors after the writing of an image signal is completed.

One of the factors in changing the electric field applied to the liquid crystal layer is adsorption of ionic impurities on an alignment film. A liquid crystal material includes ionic impurities, and when the impurities are adsorbed on the alignment film, an electric field called residual DC is generated around the alignment film. The residual DC caused by the adsorption of the impurities changes the electric field applied to the liquid crystal layer even after the writing of the image signal is completed, thereby changing the transmittance of the liquid crystal element 11. The residual DC increases when a direct-current voltage is applied to the liquid crystal element for a longer time. Hence, in the case of the driving method with a long interval between writings of image signals as in one embodiment of the present invention, the transmittance is more likely to vary than that in the case of a normal driving method with a frame frequency of about 60 Hz.

Another factor in changing the electric field applied to the liquid crystal layer is a leakage current through the liquid crystal element 11. When a voltage is applied to the liquid crystal element 11, a small amount of leakage current flows between the pixel electrode and the common electrode through the liquid crystal layer; accordingly, the absolute value of a voltage applied to the liquid crystal element 11 decreases over time. Hence, in the case of the driving method with a long interval between writings of image signals as in one embodiment of the present invention, the transmittance is more likely to vary than that in the case of a normal driving method with a frame frequency of about 60 Hz.

Still another factor in changing the electric field applied to the liquid crystal layer is accumulation of charge due to a difference in electrical characteristics between the alignment film and the liquid crystal layer. A leakage current flows in the liquid crystal element 11 through the alignment film and the liquid crystal layer. Therefore, the density of leakage current through the alignment film is equal to that of leakage current through the liquid crystal layer. However, the alignment film and the liquid crystal layer have a difference in relaxation time $\tau$ which is proportional to the product of dielectric constant $\in$ and resistivity $\rho$. Thus, when a leakage current flows in the liquid crystal element 11, charge is accumulated in the vicinity of the interface between the alignment film and the liquid crystal layer by Maxwell-Wagner polarization, and an electric field called residual DC is generated around that interface. Specifically, in the case where the alignment film has a longer relaxation time $\tau$ than the liquid crystal layer, residual DC due to the difference in relaxation time $\tau$ is generated in the direction opposite to the electric field between the pixel electrode and the common electrode, and the electric field applied to the liquid crystal layer changes so as to decrease over time. On the contrary, in the case where the alignment film has a shorter relaxation time $\tau$ than the liquid crystal layer, residual DC due to the difference in relaxation time $\tau$ is generated in the same direction as the electric field between the pixel electrode and the common electrode, and the electric field applied to the liquid crystal layer changes so as to increase over time. The residual DC caused by the difference in relaxation time $\tau$ changes the electric field applied to the liquid crystal layer even after the writing of the image signal is completed, thereby changing the transmittance of the liquid crystal element 11. The residual DC increases when a direct-current voltage is applied to the liquid crystal element for a longer time. Hence, in the case of the driving method with a long interval between writings of image signals as in one embodiment of the present invention, the transmittance is more likely to vary than that in the case of a normal driving method with a frame frequency of about 60 Hz.

<Comparative Example of Pixel>

Figure 17A:
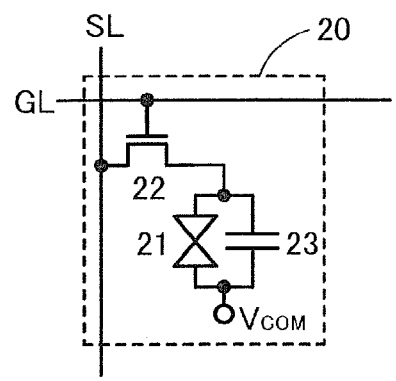
FIG. 17A illustrates a structure of a pixel and FIG. 17B is a timing chart.

FIG. 17A illustrates a structure of a pixel 20 which is a comparative example showing a change in the transmittance after the writing of an image signal is completed. The pixel 20 illustrated in FIG. 17A includes a liquid crystal element 21, a transistor 22 controlling the supply of an image signal to the liquid crystal element 21, and a capacitor 23.

The liquid crystal element 21 includes a pixel electrode, a common electrode, and a liquid crystal layer which contains a liquid crystal material and to which a voltage is applied across the pixel electrode and the common electrode. In FIG. 17A, the liquid crystal element 21 may have an area in which the pixel electrode and the common electrode overlap with each other with an insulating film interposed therebetween as in a fringe field switching (FFS) mode, or may have an area in which the pixel electrode and the common electrode overlap with each other with the liquid crystal layer interposed therebetween as in a twisted nematic (TN) mode. In the case of the FFS mode liquid crystal element 21, the capacitor 23 corresponds to a capacitor formed in the area in which the pixel electrode and the common electrode overlap with each other. In both cases of the FFS mode liquid crystal element 21 and the TN mode liquid crystal element 21, the capacitor 23 serves as a capacitor for holding a voltage $V_{LC}$ applied between the pixel electrode and the common electrode.

In the pixel 20 illustrated in FIG. 17A, a gate of the transistor 22 is connected to a wiring GL. One of a source and a drain of the transistor 22 is connected to a wiring SL, and the other of the source and the drain of the transistor 22 is connected to the pixel electrode of the liquid crystal element 21. The capacitor 23 includes a pair of electrodes: one electrode is connected to the pixel electrode of the liquid crystal element 21, and the other electrode is connected to the common electrode of the liquid crystal element 21. A potential $V_{COM}$ is applied to the common electrode.

Description is made on the operation of the pixel 20 illustrated in FIG. 17A and a change in the transmittance of the liquid crystal element 21.

Figure 17B:
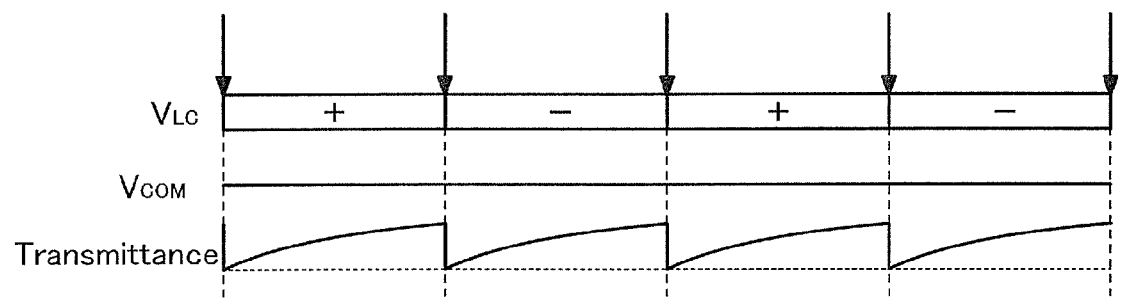

FIG. 17B schematically shows an example of a change with time of the polarity of the voltage $V_{LC}$ applied to the liquid crystal element 21 across the pixel electrode and the common electrode, the potential $V_{COM}$, and the transmittance of the liquid crystal element 21. Note that FIG. 17B shows an example in which a normally-white liquid crystal material is used for the liquid crystal layer of the liquid crystal element 21. Hence, in FIG. 17B, the transmittance of the liquid crystal element 21 decreases as a stronger electric field is applied to the liquid crystal layer; and the transmittance of the liquid crystal element 21 increases as a weaker electric field is applied to the liquid crystal layer. In FIG. 17B, arrows represent the timing at which an image signal is written to the pixel 20, and image signals each including one gray scale as image data are sequentially written to the pixel 20 as an example.

In the pixel 20, when the potential of an image signal input to the wiring SL is applied to the pixel electrode of the liquid crystal element 21 through the transistor 22, the voltage $V_{LC}$ is applied to the liquid crystal element 21. In the case where the potential of the image signal is higher than the potential $V_{COM}$, that is, the image signal has positive polarity, the voltage $V_{LC}$ has positive polarity. On the other hand, in the case where the potential of the image signal is lower than the potential $V_{COM}$, that is, the image signal has negative polarity, the voltage $V_{LC}$ has negative polarity. As illustrated in FIG. 17B, the voltage $V_{LC}$ applied to the liquid crystal element 21 has positive polarity (+) and negative polarity (−) alternately in accordance with the timing at which the image signal is written to the pixel 20.

In the case where the electric field applied to the liquid crystal layer of the liquid crystal element 21 decreases over time due to any of the aforementioned factors after the writing of the image signal is completed, the transmittance of the liquid crystal element 21 changes so as to increase between the writing of the image signal to the pixel 20 and the subsequent writing of another image signal to the pixel 20 as illustrated in FIG. 17B.

In other cases, the electric field applied to the liquid crystal layer of the liquid crystal element 21 increases over time due to any of the aforementioned factors after the writing of the image signal is completed. In that case, the transmittance of the liquid crystal element 21 changes so as to decrease between the writing of the image signal to the pixel 20 and the subsequent writing of another image signal to the pixel 20.

As illustrated in FIG. 17B, the transmittance varies more significantly as the interval between writings of image signals increases. The changed transmittance is reset to the original value in accordance with the timing at which the subsequent image signal is written. Therefore, as the interval between writings of image signals increases, a change in the transmittance which occurs when an image signal is written is more likely to be perceived by human eyes as flicker.

In view of the above, in one embodiment of the present invention, after an image signal having a first polarity is written to the pixel 10, the potential of the other electrode of the capacitor 13 changes between a first potential and a second potential which have different levels until an image signal having a second polarity is written to the pixel 10.

Figure 1B:
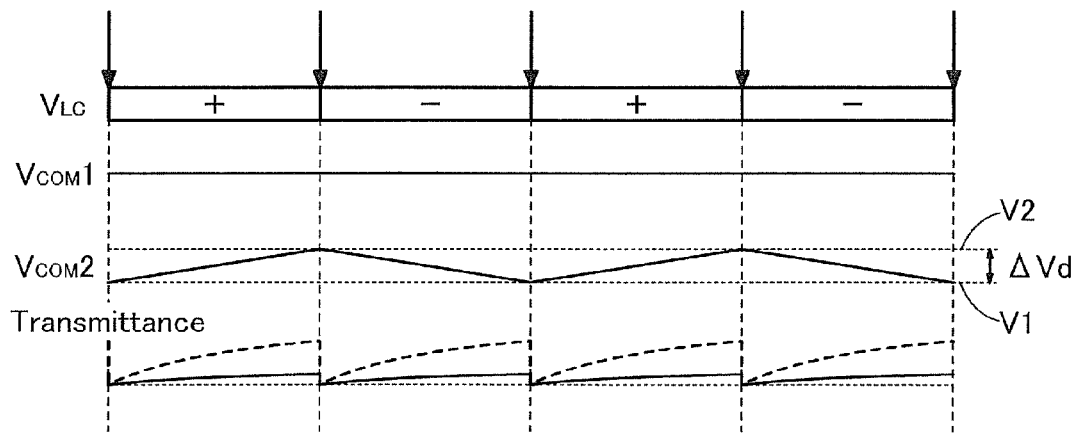
FIGS. 1B and 1C are timing charts.

FIG. 1B schematically shows an example of a change with time of the polarity of the voltage $V_{LC}$ applied to the liquid crystal element 11 across the pixel electrode and the common electrode, the potential $V_{COM}1$, the potential $V_{COM}2$, and the transmittance of the liquid crystal element 11 in the pixel 10 illustrated in FIG. 1A. Note that FIG. 1B shows an example in which a normally-white liquid crystal material is used for the liquid crystal layer of the liquid crystal element 11 as in the case of FIG. 17B. In FIG. 1B, arrows represent the timing at which an image signal is written to the pixel 10, and image signals each including one gray scale as image data are sequentially written to the pixel 10 as an example. Also in FIG. 1B, in addition to the transmittance of the liquid crystal element 11 which is denoted by a solid line, the transmittance of the liquid crystal element 21 included in the pixel 20 in FIG. 17A is denoted by a dashed line.

In the pixel 10, when the potential of an image signal input to the wiring SL is applied to the pixel electrode of the liquid crystal element 11 through the transistor 12, the voltage $V_{LC}$ is applied to the liquid crystal element 11. As illustrated in FIG. 1B, the voltage $V_{LC}$ applied to the liquid crystal element 11 has positive polarity (+) and negative polarity (−) alternately in accordance with the timing at which the image signal is written to the pixel 10.

Also in FIG. 1B, the potential $V_{COM}2$ changes between a first potential (V1) and a second potential (V2) in accordance with the timing at which the image signal is written to the pixel 10. Note that the first potential (V1) is lower than the second potential (V2) by ΔVd. Specifically, between the writing of an image signal having positive polarity to the pixel 10 and the subsequent writing of an image signal having negative polarity to the pixel 10, the potential $V_{COM}2$ changes from the first potential (V1) to the second potential (V2) so as to be increased by ΔVd. Thus, according to the principle of charge conservation, the potential of the pixel electrode of the liquid crystal element 11 is increased by ΔVd, whereby the absolute value of the voltage $V_{LC}$ applied to the liquid crystal element 11 is increased by ΔVd.

In the case where the electric field applied to the liquid crystal layer of the liquid crystal element 11 decreases over time due to any of the aforementioned factors after the writing of the image signal is completed, a change with time of the electric field applied to the liquid crystal layer can be reduced by increasing the absolute value of the voltage $V_{LC}$ by ΔVd between the writing of the image signal to the pixel 10 and the subsequent writing of another image signal to the pixel 10. As a result, as illustrated in FIG. 1B, a change in the transmittance of the liquid crystal element 11 which is denoted by a solid line can be made smaller than that of the liquid crystal element 21 which is denoted by a dashed line, so that the perception of flicker can be prevented.

Figure 1C:
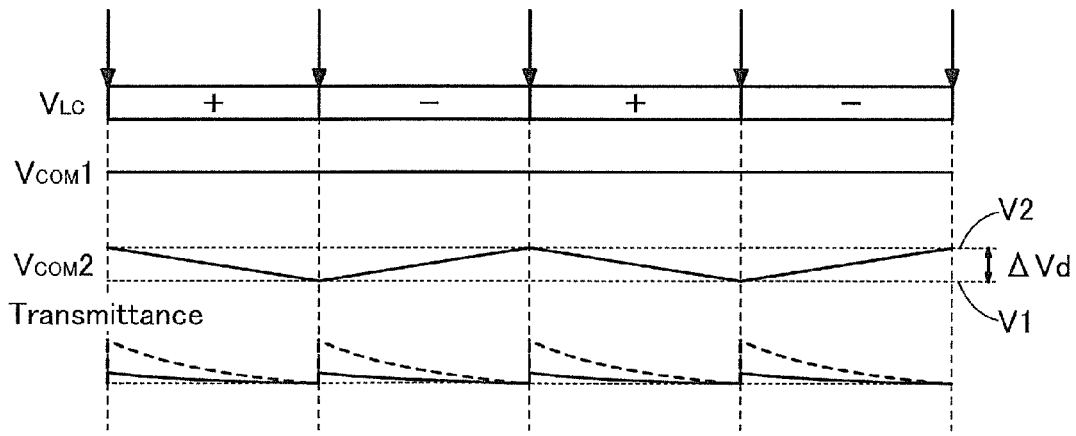

On the contrary, in the case where the electric field applied to the liquid crystal layer of the liquid crystal element 11 increases over time due to any of the aforementioned factors after the writing of the image signal is completed, the transmittance of the liquid crystal element 11 changes so as to decrease between the writing of an image signal to the pixel 10 and the subsequent writing of another image signal to the pixel 10. In that case, as illustrated in FIG. 1C, between the writing of an image signal having positive polarity to the pixel 10 and the subsequent writing of an image signal having negative polarity to the pixel 10, the potential $V_{COM}2$ changes from the second potential (V2) to the first potential (V1) so as to be lowered by ΔVd. With such a structure, the potential of the pixel electrode of the liquid crystal element 11 is lowered by ΔVd, whereby the absolute value of the voltage $V_{LC}$ applied to the liquid crystal element 11 is lowered by ΔVd. Thus, in the case where the electric field applied to the liquid crystal layer of the liquid crystal element 11 increases over time, a change with time of the electric field applied to the liquid crystal layer can be reduced by reducing the absolute value of the voltage $V_{LC}$ by ΔVd between the writing of the image signal to the pixel 10 and the subsequent writing of another image signal to the pixel 10. As a result, a change in the transmittance of the liquid crystal element 11 can be reduced, which prevents the perception of flicker.

The same applies to the case where a normally-black liquid crystal layer is used instead of the normally-white liquid crystal layer. That is to say, the potential $V_{COM}2$ changes between the first potential (V1) and the second potential (V2) so as to reduce a change with time of the electric field applied to the liquid crystal layer, whereby a change in the transmittance of the liquid crystal element 11 can be reduced, which prevents the perception of flicker.

Moreover, in the liquid crystal display device of one embodiment of the present invention, the voltage $V_{LC}$ of the liquid crystal element can be held by the capacitor 14, which results in a reduction in the area of the capacitor 13. In other words, the perception of flicker can be prevented while the area of the capacitor 13 is reduced. Accordingly, high-definition pixels are achieved and the interval between writings of image signals can be increased; it is thus possible to provide an eye-friendly liquid crystal display device that gives less eye fatigue to a user.

<Example of Structure of Panel>

Next, description will be made on an example of the structure of a panel which corresponds to one embodiment of the liquid crystal display device.

Figure 2:
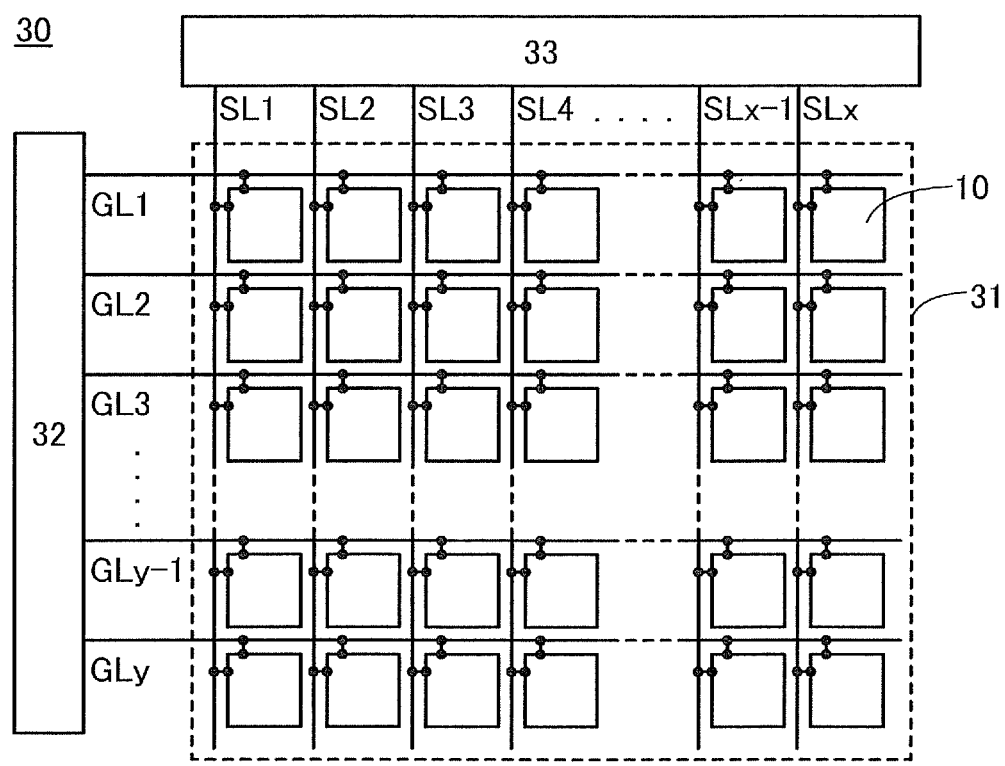
FIG. 2 illustrates a structure of a panel.

In a panel 30 illustrated in FIG. 2, a pixel portion 31 includes a plurality of pixels 10, wirings GL (wirings GL1 to GLy, y: a natural number) for selecting the pixels 10 in each row, and wirings SL (wirings SL1 to SLx, x: a natural number) for supplying image signals to the selected pixels 10. A driver circuit 32 controls the input of signals to the wirings GL, and a driver circuit 33 controls the input of image signals to the wirings SL. Each of the plurality of pixels 10 is connected to at least one of the wirings GL and at least one of the wirings SL.

Note that the kinds and number of the wirings in the pixel portion 31 can be determined by the structure, number, and arrangement of the pixels 10. Specifically, in the pixel portion 31 illustrated in FIG. 2, the pixels 10 are arranged in a matrix of x columns and y rows, and the wirings SL1 to SLx and the wirings GL1 to GLy are provided in the pixel portion 31.

<Example of Operation of Pixel Portion>

Then, an example of the operation of the pixel portion 31 will be described using FIG. 1A and FIG. 2 as an example.

Figure 3:
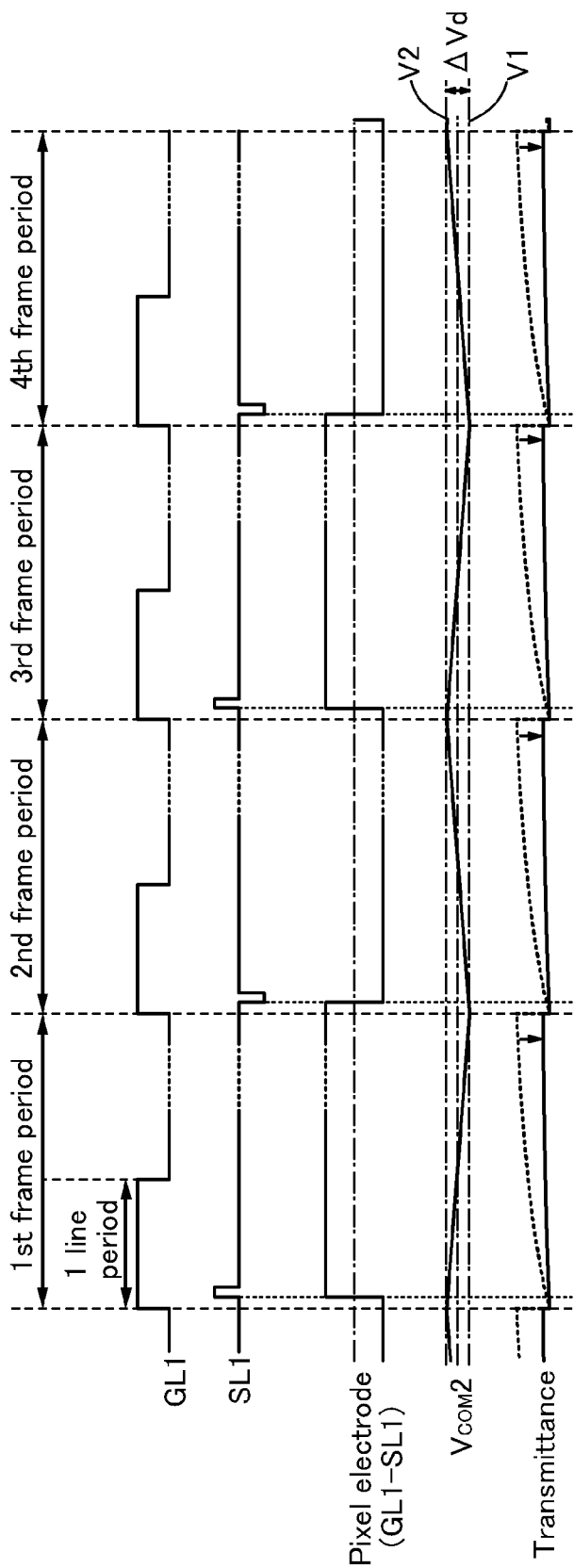
FIG. 3 is a timing chart.

FIG. 3 shows an example of a timing chart of the pixel portion 31. Specifically, FIG. 3 shows a change with time of the potential of a signal supplied to the wiring GL1, the potential of an image signal supplied to the wiring SL1, and the potential of the pixel electrode (GL1–SL1) of the liquid crystal element 11 included in the pixel 10 connected to the wiring GL1 and the wiring SL1. Further, FIG. 3 shows an example in which an n-channel transistor is used as the transistor 12 in the pixel 10 illustrated in FIG. 1A.

In a first frame period, a pulse signal is input to the wiring GL1, whereby the wiring GL1 is selected. In each of the plurality of pixels 10 connected to the selected wiring GL1, the transistor 12 is turned on. In a period during which the transistor 12 is on (in one line period), the potential of an image signal is applied to each of the wirings SL1 to SLx. On the basis of the potential of the image signal applied to each of the wirings SL1 to SLx, charge is accumulated in the capacitor 13 and the capacitor 14 through the transistor 12 which is in the on state. Further, the potential of the image signal is applied to the pixel electrode of the liquid crystal element 11 through the transistor 12 in the on state.

The timing chart of FIG. 3 shows an example in which in a period during which the wiring GL1 is selected in the first frame period, an image signal having positive polarity is input to the wiring SL1. Thus, an image signal having positive polarity is input to the pixel electrode (GL1–SL1) in the pixel 10 connected to the wiring GL1 and the wiring SL1.

Note that a reference potential $V_{COM}1$ such as a ground potential is applied to the common electrode of the liquid crystal element 11. The image signal has positive polarity when having a potential higher than the reference potential $V_{COM}1$, and the image signal has negative polarity when having a potential lower than the potential $V_{COM}1$. Note that depending on the image data contained in the image signal, the potential of the image signal might be equal to the reference potential $V_{COM}1$. In the case where the potential of the image signal is equal to the reference potential $V_{COM}1$, the image signal can be regarded as an image signal having positive or negative polarity.

The transmittance of the liquid crystal element 11 changes when the alignment of liquid crystal molecules changes in accordance with the level of a voltage applied between the pixel electrode and the common electrode. Accordingly, when the transmittance of the liquid crystal element 11 is controlled by the potential of an image signal, gray-scale images can be displayed.

When the input of image signals to the wirings SL1 to SLx is completed, the selection of the wiring GL1 is terminated. When the selection of the wiring GL1 is completed, the transistors 12 in the pixels 10 including the wiring GL1 are turned off. Then, the voltage applied between the pixel electrode and the common electrode is held in the liquid crystal element 11, so that the display of gray-scale image is maintained.

Similarly, the wirings GL2 to GLy are sequentially selected, and the pixels 10 connected to the wirings GL2 to GLy are sequentially subjected to the same operation as that performed while the wiring GL1 is selected. Through the above operations, an image can be displayed on the pixel portion 31.

In the timing chart of FIG. 3, in the first frame period, the potential $V_{COM}2$ applied to the other electrode of the capacitor 13 changes from the second potential (V2) to the first potential (V1) so as to be lowered by ΔVd. With such a structure, the potential of the pixel electrode of the liquid crystal element 11 is lowered by ΔVd, whereby the absolute value of the voltage $V_{LC}$ applied to the liquid crystal element 11 is lowered by ΔVd. Thus, in the case where the electric field applied to the liquid crystal layer of the liquid crystal element 11 increases over time, a change with time of the electric field applied to the liquid crystal layer can be reduced by reducing the absolute value of the voltage $V_{LC}$ by ΔVd between the writing of the image signal to the pixel 10 and the subsequent writing of another image signal to the pixel 10. As a result, even when the transmittance changes as indicated by a dashed line when the potential $V_{COM}2$ is constant, a change in transmittance can be reduced as indicated by a solid line by changing the potential $V_{COM}2$ from the second potential (V2) to the first potential (V1).

Note that in one embodiment of the present invention, the wirings GL1 to GLy are not necessarily selected in sequence.

Next, in a second frame period, a pulse signal is input to the wiring GL1, whereby the wiring GL1 is selected. In each of the plurality of pixels 10 connected to the selected wiring GL1, the transistor 12 is turned on. In a period during which the transistor 12 is on, the potential of an image signal is applied to each of the wirings SL1 to SLx. On the basis of the potential of the image signal applied to each of the wirings SL1 to SLx, charge is accumulated in the capacitor 13 and the capacitor 14 through the transistor 12 which is in the on state. Further, the potential of the image signal is applied to the pixel electrode of the liquid crystal element 11 through the transistor 12 in the on state.

The timing chart of FIG. 3 shows an example in which in a period during which the wiring GL1 is selected in the second frame period, an image signal having negative polarity is input to the wiring SL1. Thus, an image signal having negative polarity is input to the pixel electrode (GL1–SL1).

When the transmittance of the liquid crystal element 11 is controlled by the potential of an image signal, gray-scale images can be displayed.

When the input of image signals to the wirings SL1 to SLx is completed, the selection of the wiring GL1 is terminated. When the selection of the wiring GL1 is completed, the transistors 12 in the pixels 10 including the wiring GL1 are turned off. Then, the voltage applied between the pixel electrode and the common electrode is held in the liquid crystal element 11, so that the display of a gray-scale image is maintained.

Similarly, the wirings GL2 to GLy are sequentially selected, and the pixels 10 connected to the wirings GL2 to GLy are sequentially subjected to the same operation as that performed while the wiring GL1 is selected. Through the above operations, an image can be displayed on the pixel portion 31.

Also in the subsequent third frame period and fourth frame period, the panel 30 can be operated in a manner similar to that in the first frame period and the second frame period.

Note that in one embodiment of the present invention, after the input of image signals to all the pixels 10 in the pixel portion 31 is completed in one frame period, the operation of the driver circuit 32 and the driver circuit 33 can be stopped until the next frame period starts. When the operation of the driver circuit 32 is stopped, the selection of the wirings GL by the driver circuit 32 is stopped. When the operation of the driver circuit 33 is stopped, the input of image signals to the wirings SL by the driver circuit 33 is stopped. Through these operations, an image displayed on the pixel portion 31 is maintained.

Note that there is a limitation on a period during which the liquid crystal element 11 can maintain the display of a gray-scale image. Accordingly, in consideration of the period during which the liquid crystal element 11 can maintain the display of a gray-scale image, the maximum length of the frame period in a period during which no instruction is input for rewriting an image signal is set in advance. That is to say, in the case where a period during which a still image is displayed is longer than the maximum length of the frame period, the frame period is automatically ended even when there is no instruction for rewriting an image signal. Then, the same image signal is rewritten to the pixel portion 31 in the subsequent frame period, and the image displayed in the previous frame period is displayed again on the pixel portion 31.

Alternatively, the frame period may be brought to an end in accordance with the instruction for rewriting an image signal from an input device or the like.

In one embodiment of the present invention, since the driver circuit 32 and the driver circuit 33 are operated intermittently, the number of times of writing image signals to the pixel portion 31 can be greatly reduced while the image is continuously displayed. For example, by using a highly purified oxide semiconductor for a channel formation region of the transistor 12, the length of a frame period can be made longer than or equal to 10 seconds, preferably longer than or equal to 30 seconds, and more preferably longer than or equal to one minute. Accordingly, the drive frequency of the driver circuit 32 and the driver circuit 32 can be significantly reduced, leading to a reduction in the power consumption of the liquid crystal display device.

Note that in one embodiment of the present invention, it is possible to employ dot sequential driving in which image signals are sequentially input from the driver circuit 33 to the wirings SL1 to SLx, or line sequential driving in which image signals are concurrently input from the driver circuit 33 to the wirings SL1 to SLx. Alternatively, the liquid crystal display device of one embodiment of the present invention may employ a driving method in which image signals are sequentially input to every plural wirings SL.

The selection of the wirings GL may be performed by either progressive scan or interlaced scan.

Note that the response time of a liquid crystal from application of voltage to saturation of the change in transmittance is generally about ten milliseconds. Thus, the slow response of the liquid crystal tends to be perceived as a blur of a moving image. As a countermeasure, one embodiment of the present invention may employ overdriving in which a voltage applied to the liquid crystal element 11 is temporarily increased so that alignment of the liquid crystal is changed quickly. By overdriving, the response speed of the liquid crystal can be increased, a blur of a moving image can be prevented, and the quality of the moving image can be improved.

Further, if the transmittance of the liquid crystal element 11 keeps changing without reaching a constant value after the transistor 12 is turned off, the relative dielectric constant of the liquid crystal also changes; accordingly, the voltage held in the liquid crystal element 11 easily changes. In particular, in the case where the capacitor 13 and the capacitor 14 connected to the liquid crystal element 11 have small capacitance as in one embodiment of the present invention, the change in the voltage held in the liquid crystal element 11 tends to occur remarkably. However, by the overdriving, the response time can be shortened and therefore the change in the transmittance of the liquid crystal element 11 after the transistor 12 is turned off can be made small. Hence, even in the case where the capacitor 13 and the capacitor 14 connected in parallel to the liquid crystal element 11 have small capacitance, it is possible to prevent the change in the voltage held in the liquid crystal element 11 after the transistor 12 is turned off.

<Specific Example of Structure of Panel>

In one embodiment of the present invention, frame inversion driving, source line inversion driving, gate line inversion driving, or dot inversion driving can be employed. The frame inversion driving is a driving method in which image signals having the same polarity are input to all the pixels 10 in one frame period. The source line inversion driving is a driving method in which image signals having opposite polarities are input to the pixels 10 connected to one of the wirings SL and the pixels 10 connected to another wiring SL adjacent to the above wiring SL in one frame period. The gate line inversion driving is a driving method in which image signals having opposite polarities are input to the pixels 10 connected to one of the wirings GL and the pixels 10 connected to another wiring GL adjacent to the above wiring GL in one frame period. The dot inversion driving is a driving method in which image signals having opposite polarities are input to the pixels 10 lying next to each other among the plurality of pixels 10 connected to one of the wirings SL in one frame period, and image signals having opposite polarities are input to the pixels 10 lying next to each other among the plurality of pixels 10 connected to one of the wirings GL in one frame period.

The layout of wirings CL each connected to the other electrode of the capacitor 13 may be changed as appropriate depending on the above driving methods.

Figure 4:
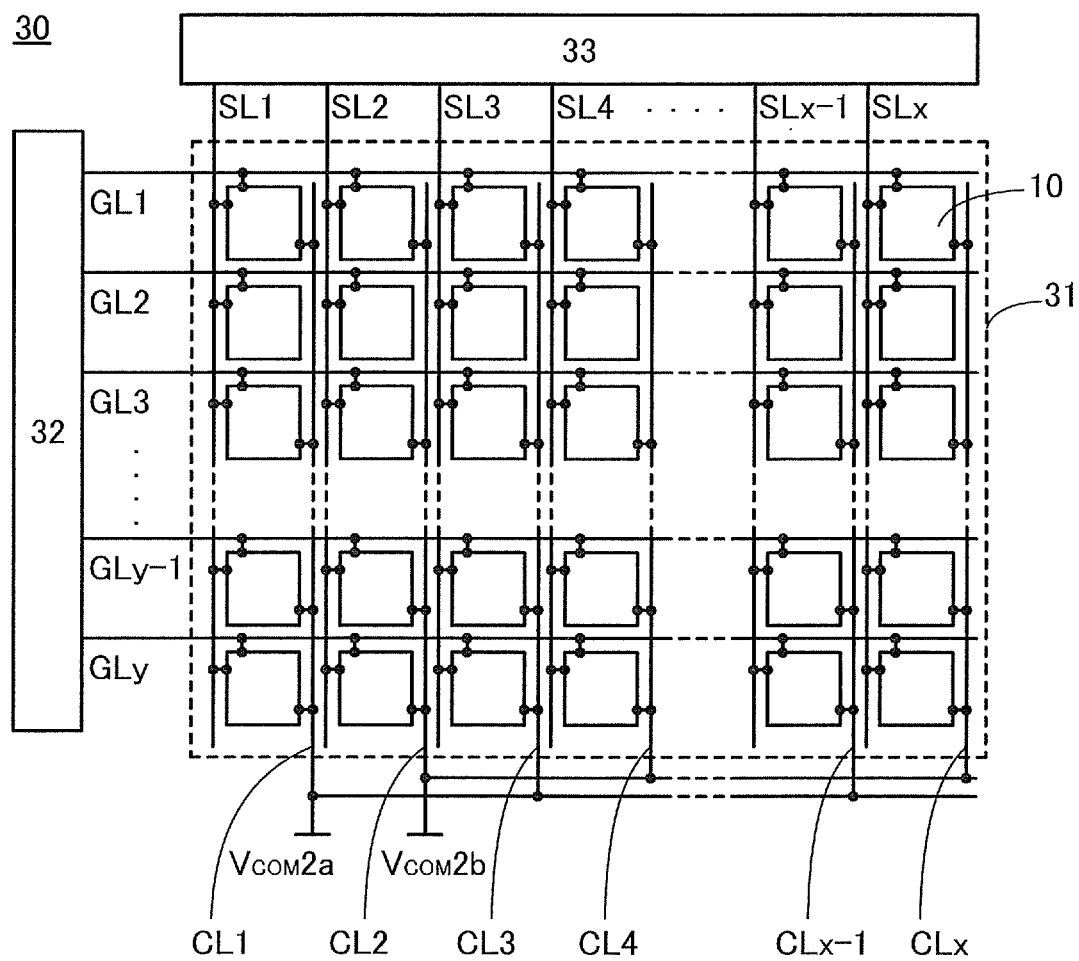
FIG. 4 illustrates a structure of a panel.

FIG. 4 illustrates a specific example of the structure of the panel 30 employing the source line inversion driving.

In the panel 30 illustrated in FIG. 4, as in the panel 30 illustrated in FIG. 2, the pixel portion 31 includes the plurality of pixels 10, the wirings GL (the wirings GL1 to GLy) for selecting the pixels 10 in each row, and the wirings SL (the wirings SL1 to SLx) for supplying image signals to the selected pixels 10. The driver circuit 32 controls the input of signals to the wirings GL, and the driver circuit 33 controls the input of image signals to the wirings SL. Each of the plurality of pixels 10 is connected to at least one of the wirings GL and at least one of the wirings SL.

The panel 30 illustrated in FIG. 4 also includes a plurality of wirings CL (wirings CL1 to CLx). In FIG. 4, the pixels 10 connected to one of the wirings SL are connected to one of the wirings CL. All the wirings CL satisfying CL2$m$+1 (m: an integer greater than or equal to 0, 2$m$+2≤x) are electrically connected to each other and have the same potential $V_{COM2}a$. All the wirings CL satisfying CL2$m$+2 are electrically connected to each other and have the same potential $V_{COM2}b$. In accordance with the timing at which image signals are written to the pixels 10, one of the potential $V_{COM2}a$ applied to the wiring CL2$m$+1 and the potential $V_{COM2}b$ applied to the wiring CL2$m$+2 changes from the first potential (V1) to the second potential (V2), and the other changes from the second potential (V2) to the first potential (V1).

Figure 6A:
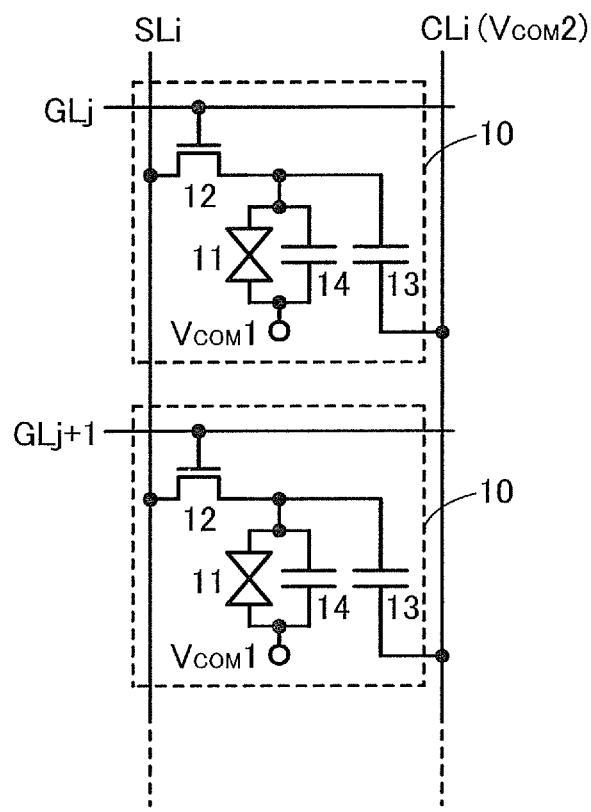
FIGS. 6A and 6B each illustrate a connection state of pixels.

FIG. 6A illustrates a specific example of the connection between the pixel 10 connected to a wiring SLi (i: a natural number greater than or equal to 1 and less than or equal to x) and a wiring GLj (j: a natural number greater than or equal to 1 and less than or equal to y−1), and the pixel 10 connected to the wiring SLi and the wiring GLj+1. As illustrated in FIG. 6A, in the panel 30 in FIG. 4, the other electrode of the capacitor 13 in each of the pixels 10 connected to the wiring SLi is electrically connected to a wiring CLi.

Figure 5:
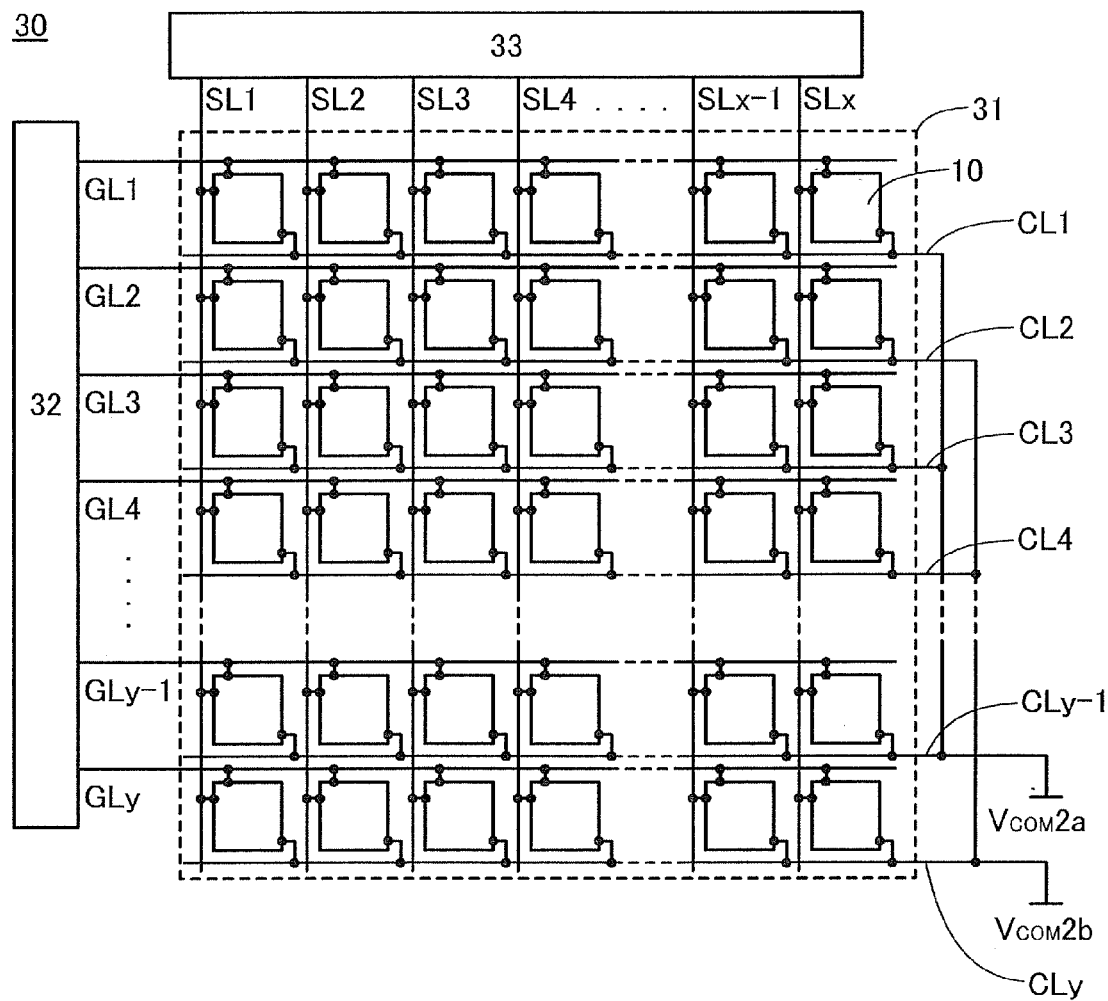
FIG. 5 illustrates a structure of a panel.

FIG. 5 illustrates a specific example of the structure of the panel 30 employing the gate line inversion driving.

In the panel 30 illustrated in FIG. 5, as in the panel 30 illustrated in FIG. 2, the pixel portion 31 includes the plurality of pixels 10, the wirings GL (the wirings GL1 to GLy) for selecting the pixels 10 in each row, and the wirings SL (the wirings SL1 to SLx) for supplying image signals to the selected pixels 10. The driver circuit 32 controls the input of signals to the wirings GL, and the driver circuit 33 controls the input of image signals to the wirings SL. Each of the plurality of pixels 10 is connected to at least one of the wirings GL and at least one of the wirings SL.

The panel 30 illustrated in FIG. 5 also includes a plurality of wirings CL (wirings CL1 to CLy). In FIG. 5, the pixels 10 connected to one of the wirings GL are connected to one of the wirings CL. All the wirings CL satisfying CL2$n$+1 (n: an integer greater than or equal to 0, 2$n$+2≤y) are electrically connected to each other and have the same potential $V_{COM2}a$. All the wirings CL satisfying CL2$n$+2 are electrically connected to each other and have the same potential $V_{COM2}b$. In accordance with the timing at which image signals are written to the pixels 10, one of the potential $V_{COM2}a$ applied to the wiring CL2$n$+1 and the potential $V_{COM2}b$ applied to the wiring CL2$n$+2 changes from the first potential (V1) to the second potential (V2), and the other changes from the second potential (V2) to the first potential (V1).

Figure 6B:
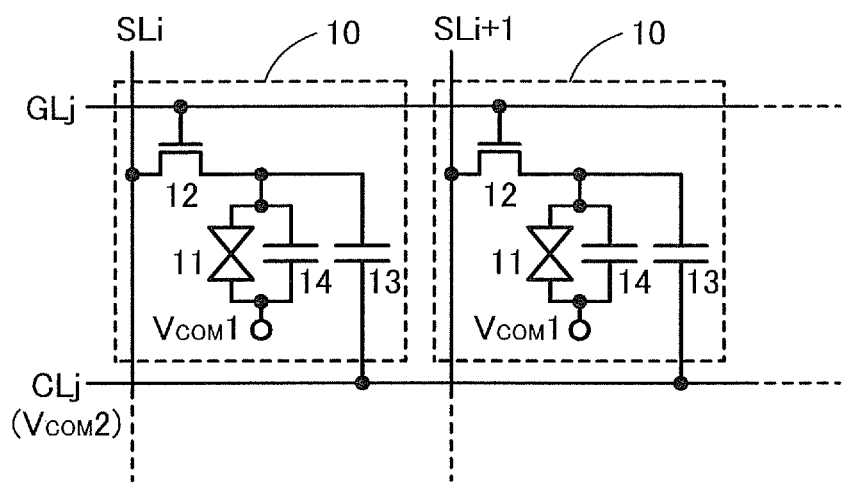

FIG. 6B illustrates a specific example of the connection between the pixel 10 connected to the wiring SLi and the wiring GLj, and the pixel 10 connected to the wiring SLi+1 and the wiring GLj. As illustrated in FIG. 6B, in the panel 30 in FIG. 5, the other electrode of the capacitor 13 in each of the pixels 10 connected to the wiring GLj is electrically connected to a wiring CLj.

Note that parasitic capacitance is formed between the pixel electrode of the liquid crystal element 11 and the wiring SL for inputting an image signal to the pixel 10. In the case where the capacitor 13 and the capacitor 14 connected to the liquid crystal element 11 have small capacitance, the potential of the pixel electrode is likely to be affected by the parasitic capacitance. Hence, there easily occurs a phenomenon called crosstalk: when the potential of the wiring SL changes in the period during which the potential of the image signal is held, the potential of the pixel electrode also fluctuates accordingly, and this crosstalk lowers the contrast.

In view of the above, the pixels are driven by the source line inversion driving or the dot inversion driving, in which case image signals having opposite polarities are input to a pair of wirings SL facing each other with the pixel electrode interposed therebetween. As a result, the potentials of a pair of wirings SL lying next to each other change in opposite directions, whereby the fluctuation of the potential of a given pixel electrode can be cancelled out; thus, occurrence of crosstalk can be prevented.

Note that the wirings CL can have various functions. For example, the wirings CL can be used as wirings for an in-cell touch sensor. The touch sensor can be achieved by, for example, reading a change in the capacitance between the wiring CLi in FIG. 6A and the wiring CLj in FIG. 6B.

<Example of Structure of Liquid Crystal Display Device>

Next, description will be made on an example of the structure of the liquid crystal display device of one embodiment of the present invention.

Figure 7:
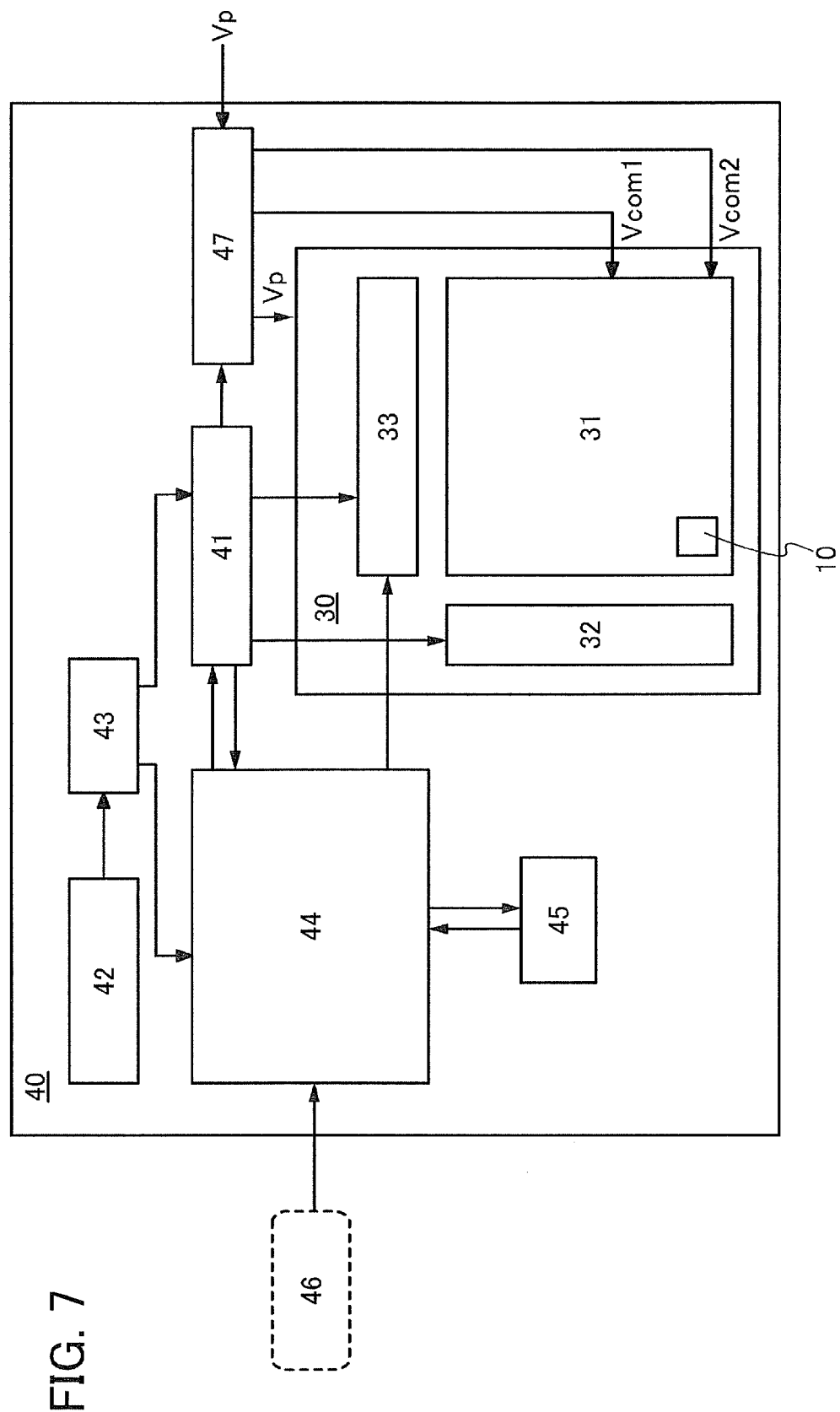
FIG. 7 illustrates a structure of a liquid crystal display device.

FIG. 7 is a block diagram illustrating an example of the structure of the liquid crystal display device of one embodiment of the present invention. A liquid crystal display device 40 illustrated in FIG. 7 includes the panel 30 provided with the plurality of pixels 10 in the pixel portion 31, a controller 41, and a power source circuit 47. The liquid crystal display device 40 illustrated in FIG. 7 also includes an input device 42, a CPU 43, an image processing circuit 44, and an image memory 45. Also in the liquid crystal display device 40 illustrated in FIG. 7, the driver circuit 32 and the driver circuit 33 are provided in the panel 30.

Note that the controller 41 has a function of supplying the panel 30 with various driving signals for controlling the operation of the driver circuit 32, the driver circuit 33, or the like. Examples of the driving signals include a start pulse signal for controlling the operation of the driver circuit 33, a clock signal for the driver circuit 33, a start pulse signal for controlling the operation of the driver circuit 32, and a clock signal for the driver circuit 32.

The input device 42 has a function of applying data or an instruction to the CPU 43 included in the liquid crystal display device 40. For example, an instruction to transfer the panel 30 from an operation state to a non-operation state, or an instruction to transfer the pixel portion 31 from a non-operation state to an operation state can be given to the CPU 43 by the input device 42. As the input device 42, a keyboard, a pointing device, a touch panel, or the like can be used.

The CPU 43 has a function of decoding an instruction input from the input device 42 and executing the instruction by totally controlling the operation of various circuits included in the liquid crystal display device 40.

For example, in the case where the instruction to transfer the pixel portion 31 from the operation state to the non-operation state is sent from the input device 42, the CPU 43 gives an instruction to the controller 41 to stop the supply of a power source voltage Vp from the power source circuit 47 to the pixel portion 31, and to stop the supply of a driving signal to the panel 30.

In the case where an instruction to transfer the pixel portion 31 from the non-operation state to the operation state is sent from the input device 42, the CPU 43 gives the instruction to the controller 41 to restart the supply of the power source voltage Vp from the power source circuit 47 to the pixel portion 31, and to restart the supply of the driving signal to the panel 30.

The image memory 45 has a function of storing data 46 which has image data and is input to the liquid crystal display device 40. Note that although just one image memory 45 is provided in the liquid crystal display device 40 in FIG. 7, a plurality of image memories 45 may be provided in the liquid crystal display device 40. For example, in the case where a full-color image is displayed on the pixel portion 31 with the use of three pieces of data 46 corresponding to hues such as red, blue, and green, the image memory 45 corresponding to the data 46 of each hue may be provided.

As the image memory 45, for example, memory circuits such as a dynamic random access memory (DRAM) or a static random access memory (SRAM) can be used. Alternatively, a video RAM (VRAM) may be used as the image memory 45.

The image processing circuit 44 has a function of writing and reading the data 46 to and from the image memory 45 in response to an instruction from the controller 41 and generating an image signal from the data 46.

The power source circuit 47 has a function of supplying the power source voltage Vp to the panel 30 and supplying the potential $V_{COM}1$ and the potential $V_{COM}2$ to the pixel 10. The potential $V_{COM}2$ is generated in a circuit 150 (see FIG. 8) included in the power source circuit 47. The circuit 150 illustrated in FIG. 8 includes a switch 151, a switch 152, a resistor 153, a resistor 154, a capacitor 155, an amplifier 156, and an inverter 161.

The resistor 153 and the resistor 154 are electrically connected in series to each other. The switch 151 has a function of controlling the electrical connection between a first terminal of the resistor 153 and a wiring 159 having the second potential (V2). The switch 152 has a function of controlling the electrical connection between a first terminal of the resistor 154 and a wiring 160 having the first potential (V1). Note that the first potential (V1) and the second potential (V2) which have a potential difference may be generated from the power source voltage Vp or separately supplied to the power source circuit 47 from the outside of the liquid crystal display device 40.

A potential applied to a terminal 157 is input to the switch 151. Further, the potential applied to the terminal 157 is inverted in polarity by the inverter 161, and then input to the switch 152. Thus, one of the switches 151 and 152 is brought into a conductive state and the other, a non-conductive state depending on the potential applied to the terminal 157.

A second terminal of the resistor 153 and a second terminal of the resistor 154 are electrically connected to a non-inverting input terminal (+) of the amplifier 156. A first electrode of the capacitor 155 is electrically connected to the non-inverting input terminal (+) of the amplifier 156, and a second electrode of the capacitor 155 has a predetermined potential. An inverting input terminal (−) of the amplifier 156 is electrically connected to an output terminal of the amplifier 156. The potential of the output terminal of the amplifier 156 is applied to the terminal 158 as the potential $V_{COM}2$.

The amplifier 156 whose inverting input terminal (−) is connected to the output terminal thereof serves as an impedance converter. Further, the resistors 153 and 154 connected in series serve as a resistor divider circuit. The potential applied to the second terminals of the resistors 153 and 154 is determined by the ratio of the resistances of the resistors 153 and 154 and the potential difference between the first potential (V1) and the second potential (V2).

The use of the circuit 150 having the above structure makes it possible to generate the potential $V_{COM}2$ which changes between the first potential (V1) and the second potential (V2).

Note that the power source circuit 47 preferably includes two circuits 150 in the case where the potential $V_{COM}2a$ and the potential $V_{COM}2b$ need to be supplied in parallel to the pixel portion in one frame period as in the case of the source line inversion driving, the gate line inversion driving, or the dot inversion driving.

Figure 8:
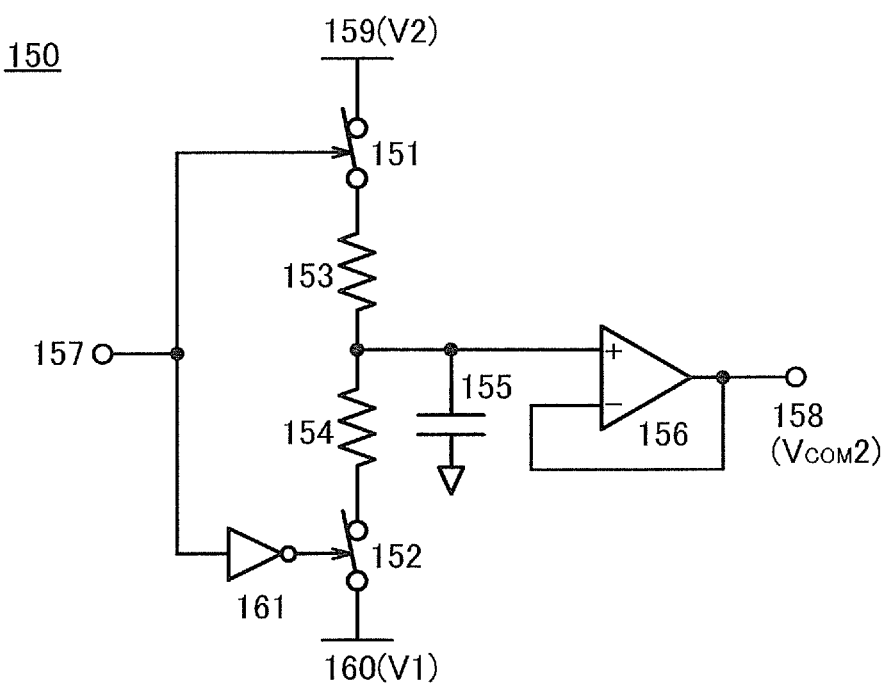
FIG. 8 illustrates a structure of a circuit included in a power source circuit.
Figure 9:
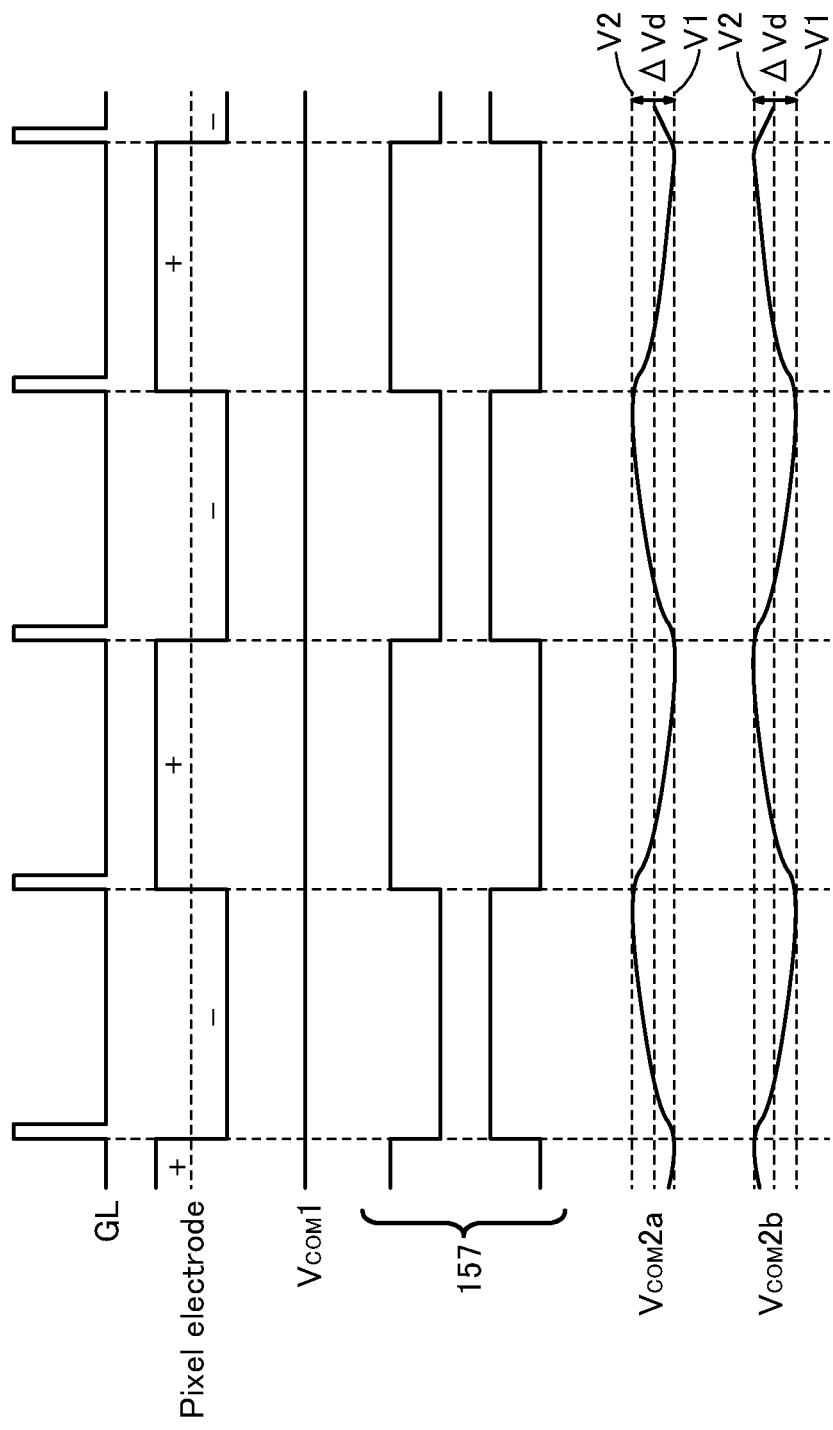
FIG. 9 is a timing chart.

FIG. 9 is a timing chart of the potential of the terminal 157 included in the circuit 150 in FIG. 8 and a timing chart of the potentials $V_{COM}2a$ and $V_{COM}2b$ applied to the terminal 158. FIG. 9 also shows a timing chart of the potential of the wiring GL included in the panel 30 in FIG. 2, a timing chart and polarity of the potential of the pixel electrode included in the liquid crystal element 11 in FIG. 1A, and a timing chart of the potential $V_{COM}1$.

Although the resistors 153 and 154 serve as a divider circuit in the circuit 150 illustrated in FIG. 8, a constant current source may serve as a divider circuit instead of the resistor 153 or the resistor 154. Note that when the resistors 153 and 154 serve as a divider circuit, the potential $V_{COM}2$ (the potentials $V_{COM}2a$ and $V_{COM}2b$) can be made to change between the first potential (V1) and the second potential (V2) so that the amount of change per hour decreases over time as illustrated in FIG. 9.

Specifically, in FIG. 9, when the potential applied to the terminal 157 is switched from the high level to the low level, the potential $V_{COM}2a$ gradually increases from the first potential (V1) over time. Then, the potential $V_{COM}2a$ reaches the second potential (V2) though the amount of change in the potential $V_{COM}2a$ decreases over time. When the potential applied to the terminal 157 is switched from the low level to the high level, the potential $V_{COM}2a$ gradually decreases from the second potential (V2) over time. Then, the potential $V_{COM}2a$ reaches the first potential (V1) though the amount of change in the potential $V_{COM}2a$ decreases over time.

Also specifically, in FIG. 9, when the potential applied to the terminal 157 is switched from the low level to the high level, the potential $V_{COM}2b$ gradually decreases from the second potential (V2) over time. Then, the potential $V_{COM}2b$ reaches the first potential (V1) though the amount of change in the potential $V_{COM}2b$ decreases over time. When the potential applied to the terminal 157 is switched from the high level to the low level, the potential $V_{COM}2b$ gradually increases from the first potential (V1) over time. Then, the potential $V_{COM}2b$ reaches the second potential (V2) though the amount of change in the potential $V_{COM}2b$ decreases over time.

Given t is the time from the instant the potential applied to the terminal 157 is switched from the low level to the high level while the potential $V_{COM}2$ is the first potential (V1), the relationship between time t and the potential $V_{COM}2$ is represented by the following formula 1, where R is the resistance of the resistor 153 and C is the capacitance of the capacitor 155.

$$V_{COM}2(t)=V2-(V2-V1)\exp[-t/(CR)] \quad \text{(formula 1)}$$

Note that in the pixel 20 illustrated in FIG. 17A, the amount of change in the transmittance of the liquid crystal element 21 per hour is not always constant after the writing of an image signal to a pixel is completed, but decreases over time as illustrated in FIG. 17B. Thus, when the potential $V_{COM}2$ generated in the circuit 150 in FIG. 8 is used in the pixel 10 in FIG. 1A, the potential $V_{COM}2$ can be made to change in accordance with the amount of change in the transmittance described above. As a result, the amount of change in the transmittance of the liquid crystal element 11 can be made smaller than that in the case where the potential $V_{COM}2$ is constant.

<Layout of Pixel>

Figure 10:
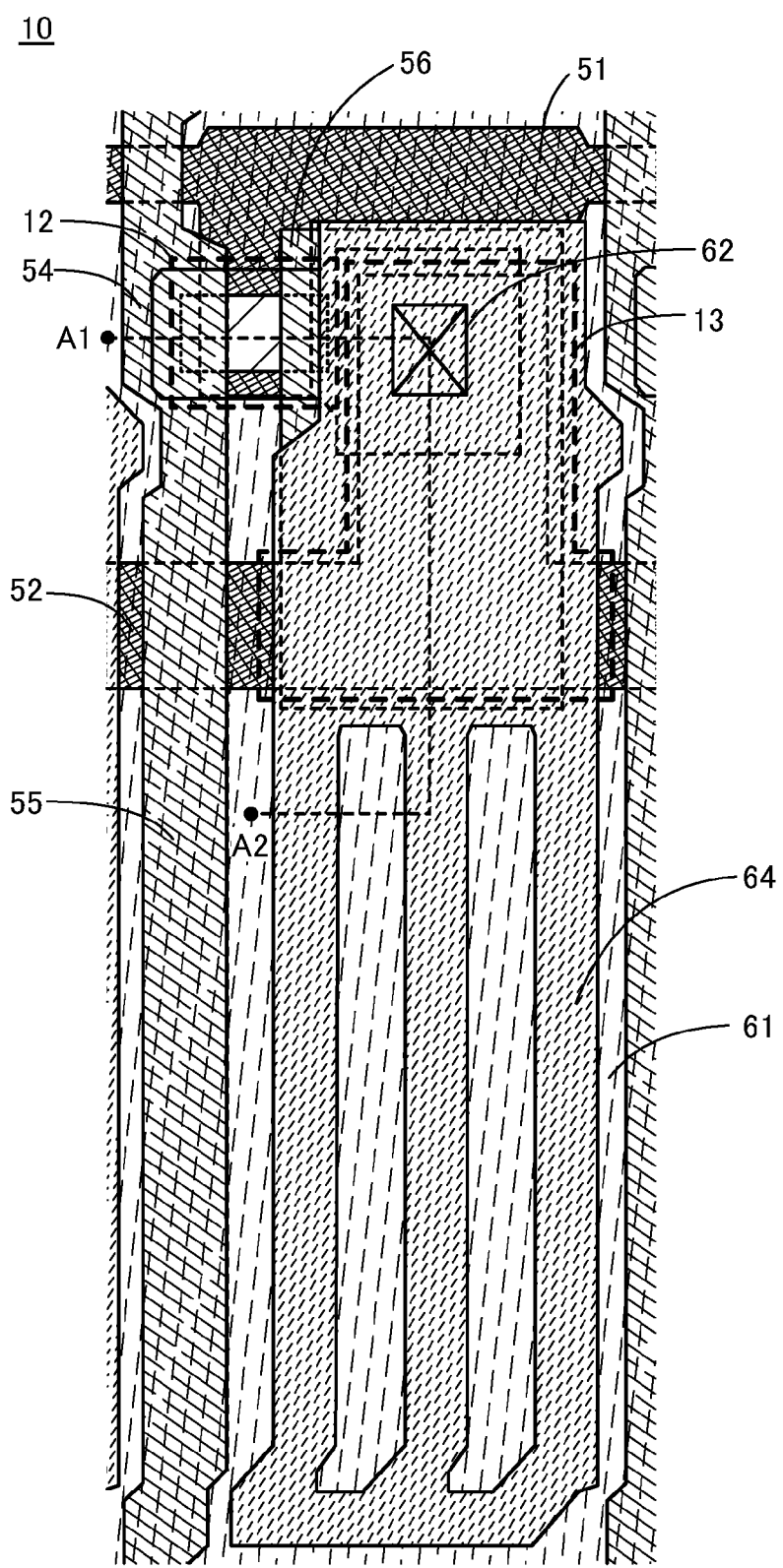
FIG. 10 is a top view of a pixel.
Figure 11:
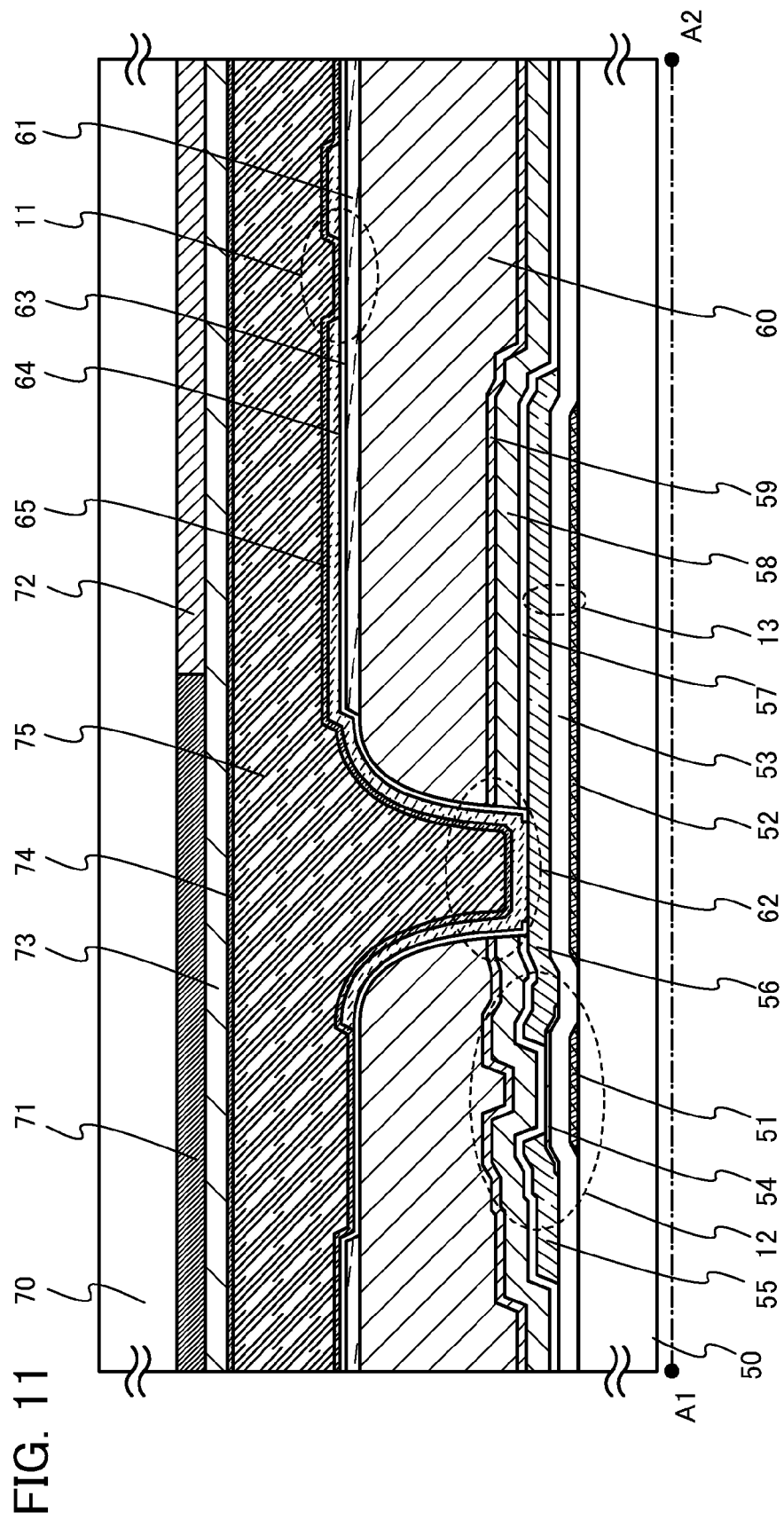
FIG. 11 is a cross-sectional view of a panel.

Next, FIG. 10 illustrates an example of the layout of the pixel 10 in FIG. 1A. Note that in FIG. 10, various insulating films such as a gate insulating film are omitted for clearly showing the layout of the pixel 10. FIG. 11 is a cross-sectional view of a liquid crystal display device using an element substrate illustrated in FIG. 10. In the liquid crystal display device in FIG. 11, the element substrate including a substrate 50 corresponds to a cross-sectional view along dashed line A1-A2 of FIG. 10.

In the pixel 10 illustrated in FIG. 10 and FIG. 11, a conductive film 51 serving as the gate of the transistor 12 and the wiring GL is provided over the substrate 50 having an insulating surface. In addition, a conductive film 52 serving as an electrode of the capacitor 13 and the wiring CL is provided over the substrate 50. That is to say, the potential $V_{COM}2$ is applied to the conductive film 52.

An insulating film 53 is provided over the substrate 50 so as to cover the conductive films 51 and 52. Further, a semiconductor film 54 of the transistor 12 is provided over the conductive film 51 with the insulating film 53 interposed therebetween. A conductive film 55 and a conductive film 56 are provided over the semiconductor film 54. The conductive film 55 serves as the wiring SL and the source or the drain of the transistor 12. The conductive film 56 serves as the source or the drain of the transistor 12 and an electrode of the capacitor 13.

The area where the conductive film 52 overlaps with the conductive film 56 with the insulating film 53 interposed therebetween serves as the capacitor 13.

An oxide film 57, an insulating film 58, and an insulating film 59 are stacked in order over the semiconductor film 54, the conductive film 55, and the conductive film 56. An organic resin film 60 is provided over the insulating film 59. An opening 62 is provided in the oxide film 57, the insulating film 58, the insulating film 59, and the organic resin film 60.

A conductive film 61 serving as a common electrode is provided in a region over the organic resin film 60 excluding the opening 62. An insulating film 63 is provided over the conductive film 61, and a conductive film 64 serving as a pixel electrode is provided over the conductive film 61 with the insulating film 63 interposed therebetween. The insulating film 63 includes an opening overlapping with the opening 62, and the conductive film 64 is connected to the conductive film 56 through the opening of the insulating film 63. An alignment film 65 is provided over the conductive film 64.

A substrate 70 is provided so as to face the substrate 50. The substrate 70 is provided with a shielding film 71 blocking visible light, and a color layer 72 transmitting visible light in a specific wavelength range. A resin film 73 is provided on the shielding film 71 and the color layer 72, and an alignment film 74 is provided on the resin film 73. The resin film 73 has a function of preventing the shape of the surfaces of the shielding film 71 and the color layer 72 from affecting the planarity of the alignment film 74.

Between the substrate 50 and the substrate 70, a liquid crystal layer 75 containing a liquid crystal material is interposed between the alignment film 65 and the alignment film 74. The liquid crystal element 11 includes the conductive film 61, the conductive film 64, and the liquid crystal layer 75.

Figure 15:
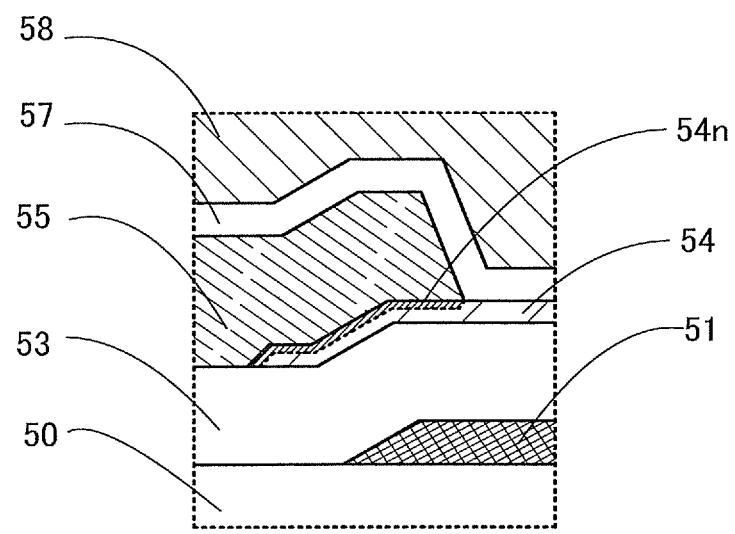
FIG. 15 is a cross-sectional view of a transistor.

Note that in the case where an oxide semiconductor is used for the semiconductor film 54, oxygen might be extracted from the oxide semiconductor by a metal in the conductive films 55 and 56 depending on the conductive material for the conductive films 55 and 56. In that case, a region of the semiconductor film 54 that is in contact with the conductive films 55 and 56 becomes an n-type semiconductor region due to the formation of oxygen vacancies. FIG. 15 is an enlarged view of part of the transistor 12 in FIG. 11. In FIG. 15, a region 54n of the semiconductor film 54 that is in contact with the conductive films 55 and 56 is an n-type semiconductor region.

The n-type region 54n serves as a source region or a drain region, resulting in a decrease in the contract resistance between the semiconductor film 54 and the conductive films 55 and 56. Accordingly, the formation of the n-type region 54n increases the mobility and on-state current of the transistor 12, which achieves high-speed operation of a semiconductor device using the transistor 12.

Note that the extraction of oxygen by a metal in the conductive films 55 and 56 is probably caused when the conductive films 55 and 56 are formed by a sputtering method or when heat treatment is performed after the formation of the conductive films 55 and 56.

The n-type region is more likely to be formed by forming the conductive films 55 and 56 with use of a conductive material which is easily bonded to oxygen. Examples of such a conductive material include Al, Cr, Cu, Ta, Ti, Mo, and W.

<Manufacturing Method>

Next, description will be made on an example of a method for manufacturing the element substrate illustrated in FIG. 10.

Figure 12A:
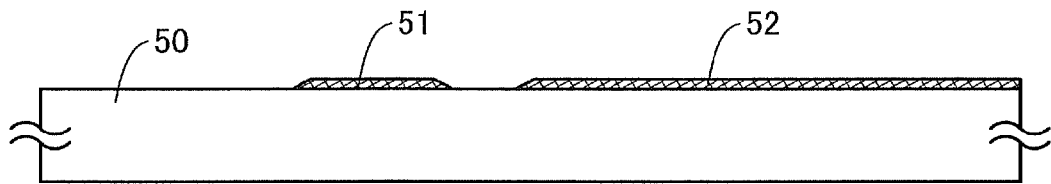
FIGS. 12A to 12D illustrate a method for manufacturing a transistor.

As illustrated in FIG. 12A, a conductive film is formed over the substrate 50, and then, the shape of the conductive film is processed (patterning) by etching or the like, whereby the conductive films 51 and 52 are formed.

The substrate 50 is preferably a substrate having heat resistance high enough to withstand a later manufacturing step; for example, a glass substrate, a ceramic substrate, a quartz substrate, or a sapphire substrate.

Each of the conductive films 51 and 52 may be formed using a single layer or a stacked layer of a conductive film containing one or more kinds selected from aluminum, titanium, chromium, cobalt, nickel, copper, yttrium, zirconium, molybdenum, ruthenium, silver, tantalum, and tungsten. For example, the conductive films 51 and 52 may be a conductive film in which a copper film is stacked over a tungsten nitride film or a single-layer tungsten film.

Figure 12B:
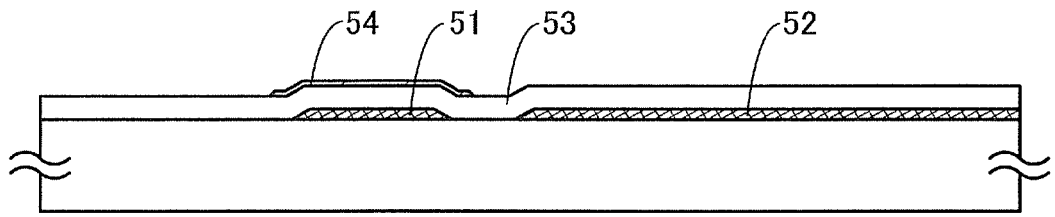

Next, the insulating film 53 is formed to cover the conductive films 51 and 52; then, the semiconductor film 54 is formed over the insulating film 53 so as to overlap with the conductive film 51 (see FIG. 12B).

The insulating film 53 may be formed using a single layer or a stacked layer of an insulating film containing one or more kinds of aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide.

For example, in the case where the insulating film 53 has a two-layer structure, a silicon nitride film and a silicon oxide film may be used as the first layer and the second layer, respectively. A silicon oxynitride film may be used as the second layer instead of the silicon oxide film. A silicon nitride oxide film may be used as the first layer instead of the silicon nitride film.

As the silicon oxide film, a silicon oxide film with a low defect density is preferably used. Specifically, a silicon oxide film which has a spin density of $3 \times 10^{17}$ spins/cm$^3$ or less, preferably $5 \times 10^{16}$ spins/cm$^3$ or less corresponding to a signal at a g-factor of 2.001 in electron spin resonance (ESR) spectroscopy is used. As the silicon oxide film, a silicon oxide film having excess oxygen is preferably used. As the silicon nitride film, a silicon nitride film from which hydrogen and ammonia are less released is used. The amount of released hydrogen and ammonia is preferably measured by thermal desorption spectroscopy (TDS) analysis.

An oxide semiconductor film can be used as the semiconductor film 54. When the oxide semiconductor film used as the semiconductor film 54 contains a large amount of hydrogen, the hydrogen and the oxide semiconductor are bonded to each other, so that part of the hydrogen becomes donors and generates electrons serving as carriers. As a result, the threshold voltage of the transistor shifts in the negative direction. Therefore, it is preferable that, after forming the oxide semiconductor film, dehydration treatment (dehydrogenation treatment) be performed to remove hydrogen or moisture from the oxide semiconductor film so that the oxide semiconductor film contains impurities as little as possible.

Note that oxygen in the oxide semiconductor film is also reduced by the dehydration treatment (dehydrogenation treatment) in some cases. Accordingly, it is preferable that oxygen be added to the oxide semiconductor film to fill oxygen vacancies increased by the dehydration treatment (dehydrogenation treatment).

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) oxide semiconductor film or a substantially i-type (intrinsic) oxide semiconductor film which is extremely close to an i-type oxide semiconductor film.

Figure 12C:
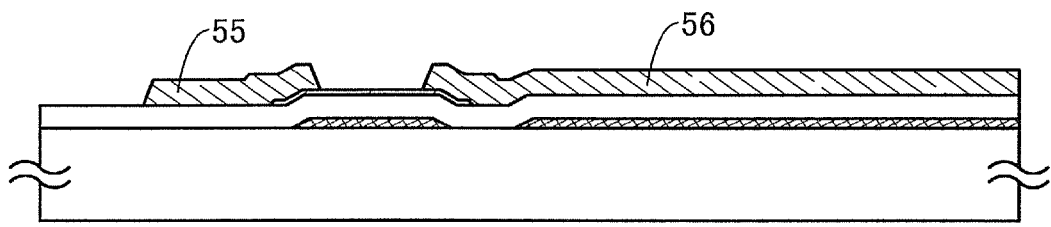

Next, a conductive film is formed over the semiconductor film 54 and the insulating film 53; then, the shape of the conductive film is processed by etching or the like, whereby the conductive films 55 and 56 are formed in contact with the semiconductor film 54 (see FIG. 12C). The conductive film 56 is formed over the insulating film 53 so as to overlap with the conductive film 52. The conductive films 55 and 56 can be formed using the same conductive material as the conductive films 51 and 52.

Figure 12D:
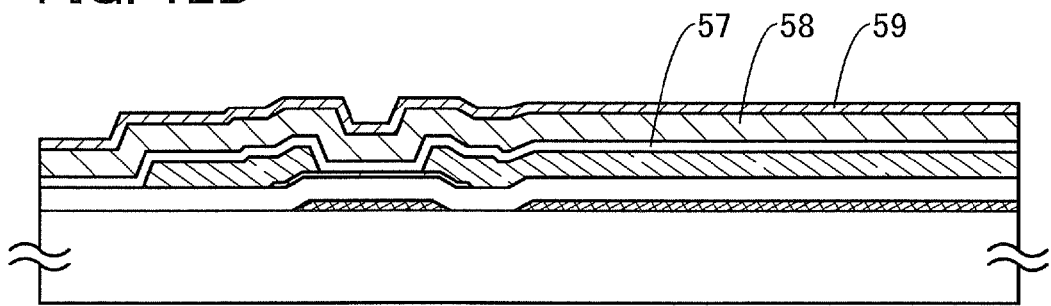

Then, an oxide film or an insulating film is formed to cover the substrate 50. FIG. 12D shows an example in which the oxide film 57, the insulating film 58, and the insulating film 59 are stacked in order.

A metal oxide is preferably used for the oxide film 57. By using such an oxide film 57, the semiconductor film 54 can be isolated from the insulating film 58 containing silicon. Thus, in the case where a metal oxide containing indium is used for the semiconductor film 54, the bond between indium and oxygen at an edge of the semiconductor film 54 can be prevented from being cut by silicon having a higher ability than indium to bind to oxygen, so that the formation of oxygen vacancies can be prevented. As a result, one embodiment of the present invention further increases the reliability of the transistor.

Specifically, the oxide film 57 can be formed by a sputtering method using an In—Ga—Zn-based oxide target with a metal atomic ratio of 1:6:4 or 1:3:2.

The insulating film 59 is preferably formed without exposure to the atmosphere following the formation of the insulating film 58. After the insulating film 58 is formed, the insulating film 59 is formed in succession by adjusting at least one of the flow rate of the source gas, the pressure, the high-frequency power, and the substrate temperature without exposure to the atmosphere, whereby the concentration of impurities at the interface between the insulating film 58 and the insulating film 59 can be reduced and further oxygen contained in the insulating film 59 can move to the semiconductor film 54, resulting in a reduction in the number of oxygen vacancies in the semiconductor film 54.

The silicon oxide film or the silicon oxynitride film which is used as the insulating film 58 can be formed under the following conditions: the substrate placed in a treatment chamber of a plasma CVD apparatus, which is vacuum-evacuated, is held at a temperature higher than or equal to 180° C. and lower than or equal to 400° C., preferably higher than or equal to 200° C. and lower than or equal to 370° C., the pressure in the treatment chamber is greater than or equal to 30 Pa and less than or equal to 250 Pa, preferably greater than or equal to 40 Pa and less than or equal to 200 Pa with introduction of a source gas into the treatment chamber, and high-frequency power is supplied to an electrode provided in the treatment chamber.

The source gas of the insulating film 58 is preferably a deposition gas containing silicon and an oxidizing gas. Typical examples of the deposition gas containing silicon include silane, disilane, trisilane, and silane fluoride. Examples of the oxidizing gas include oxygen, ozone, dinitrogen monoxide, and nitrogen dioxide.

Under the above conditions, an oxide insulating film which passes oxygen can be formed as the insulating film 58. Further, the insulating film 58 reduces damage to the oxide film 57 in a later step of forming the insulating film 59.

By setting the ratio of the amount of the oxidizing gas to the amount of the deposition gas containing silicon 100 or higher, the hydrogen content in the insulating film 58 can be reduced and the dangling bonds contained in the insulating film 58 can be reduced. Oxygen moving from the insulating film 59 is captured by the dangling bonds contained in the insulating film 58 in some cases; thus, oxygen in the insulating film 59 containing oxygen at a higher proportion than the stoichiometric composition can move to the semiconductor film 54 efficiently to fill oxygen vacancies in the semiconductor film 54. As a result, the amount of hydrogen entering the semiconductor film 54 can be reduced and oxygen vacancies contained in the semiconductor film 54 can be reduced. Accordingly, a negative shift in the threshold voltage of the transistor can be reduced, and leakage current between the source and the drain of the transistor can be reduced, leading to an improvement in the electrical characteristics of the transistor.

In this embodiment, as the insulating film 58, a 50-nm-thick silicon oxynitride film is formed by a plasma CVD method under the following conditions: silane with a flow rate of 20 sccm and dinitrogen monoxide with a flow rate of 3000 sccm are used as the source gases, the pressure in the treatment chamber is 40 Pa, the substrate temperature is 220° C., and a high-frequency power of 100 W is supplied to parallel plate electrodes with a high-frequency power supply of 27.12 MHz. Note that a plasma CVD apparatus is a parallel plate plasma CVD apparatus in which the electrode area is 6000 cm$^2$, and power per unit area (power density) into which supplied power is converted is $1.6 \times 10^{-2}$ W/cm$^2$. Under the above conditions, a silicon oxynitride film that passes oxygen can be formed.

As the insulating film 59, a silicon oxide film or a silicon oxynitride film is formed under the following conditions: the substrate placed in a treatment chamber of the plasma CVD apparatus that is vacuum-evacuated is held at a temperature higher than or equal to 180° C. and lower than or equal to 260° C., preferably higher than or equal to 180° C. and lower than or equal to 230° C., the pressure is greater than or equal to 100 Pa and less than or equal to 250 Pa, preferably greater than or equal to 100 Pa and less than or equal to 200 Pa with introduction of a source gas into the treatment chamber, and a high-frequency power of 0.17 W/cm$^2$ to 0.5 W/cm$^2$, preferably 0.25 W/cm$^2$ to 0.35 W/cm$^2$ is supplied to an electrode provided in the treatment chamber.

As the deposition conditions of the insulating film 59, the high-frequency power having the power density is supplied to the electrode in the treatment chamber having the pressure, so that the degradation efficiency of the source gas in plasma is increased, oxygen radicals are increased, and oxidation of the source gas is promoted. Thus, the oxygen content in the insulating film 59 becomes higher than that in the stoichiometric composition. However, in the case where the substrate temperature is within the above temperature range, the bond between silicon and oxygen is weak; thus, part of oxygen is released by heating. Accordingly, it is possible to form an oxide insulating film which contains oxygen at a higher proportion than the stoichiometric composition and from which part of oxygen is released by heating. Further, the insulating film 58 is provided over the oxide film 57. Hence, in the process of forming the insulating film 59, the insulating film 58 serves as a protective film of the oxide film 57. Consequently, the insulating film 59 can be formed using the high-frequency power having high power density while damage to the semiconductor film 54 is reduced.

In this embodiment, as the insulating film 59, a 400-nm-thick silicon oxynitride film is formed by a plasma CVD method under the following conditions: silane with a flow rate of 160 sccm and dinitrogen monoxide with a flow rate of 4000 sccm are used as the source gases, the pressure in the treatment chamber is 200 Pa, the substrate temperature is 220° C., and a high-frequency power of 1500 W is supplied to parallel plate electrodes with a high-frequency power supply of 27.12 MHz. Note that a plasma CVD apparatus is a parallel plate plasma CVD apparatus in which the electrode area is 6000 cm$^2$, and power per unit area (power density) into which supplied power is converted is $2.5 \times 10^{-1}$ W/cm$^2$.

It is preferable that heat treatment be performed at least after the formation of the insulating film 59 so that oxygen contained in the insulating film 58 or the insulating film 59 enters the oxide film 57 and the semiconductor film 54 to fill oxygen vacancies in the oxide film 57 and the semiconductor film 54. The heat treatment can be performed as heat treatment for dehydrogenation or dehydration of the semiconductor film 54.

Next, the organic resin film 60 is formed to cover the substrate 50. The organic resin film 60 is an underlying film of the conductive film 61 and the conductive film 64, and has a function of preventing the formation of unevenness on the conductive film 61 serving as the common electrode and the conductive film 64 serving as the pixel electrode due to the transistor, the conductive films, and the like. For the organic resin film 60, an acrylic resin, a polyimide resin, or the like can be used.

Figure 13A:
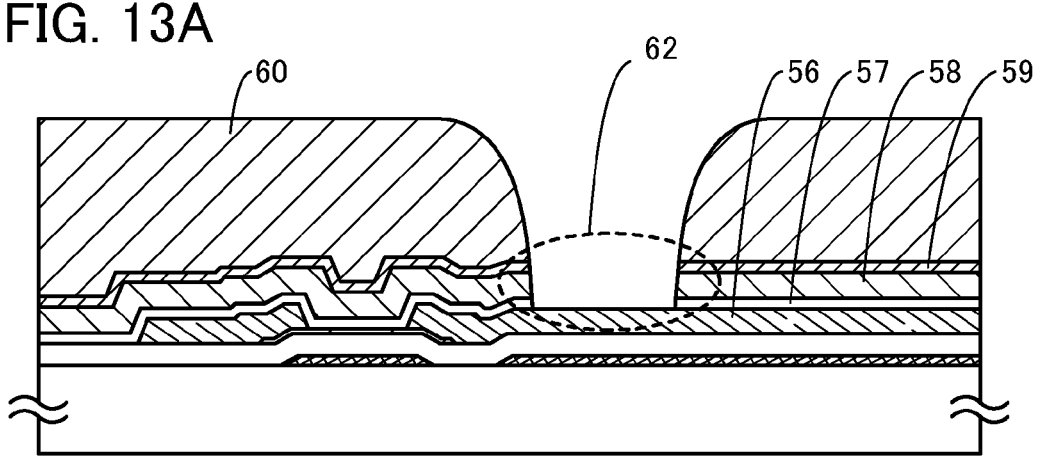
FIGS. 13A to 13C illustrate a method for manufacturing a transistor.

Then, the opening 62 is formed in the organic resin film 60, the oxide film 57, the insulating film 58, and the insulating film 59 (see FIG. 13A). The conductive film 56 is partly exposed in the opening 62.

Note that the opening 62 may be formed using one photomask, or different photomasks may be used for forming the opening in the organic resin film 60 and forming the opening in the oxide film 57 and the insulating films 58 and 59.

Figure 13B:
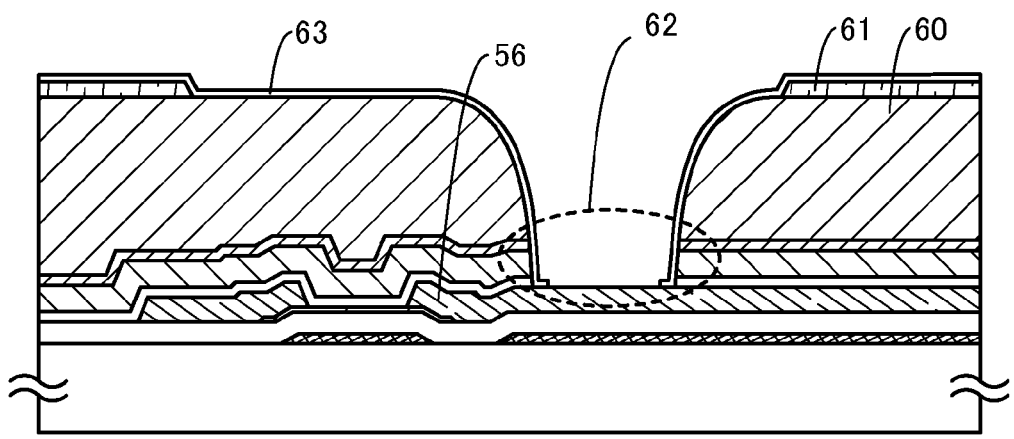

Next, a transparent conductive film is formed over the organic resin film 60 and processed into a desired shape by etching or the like, whereby the conductive film 61 is formed. Then, the insulating film 63 is formed over the conductive film 61 and the organic resin film 60. After that, an opening is formed in the insulating film 63 so that the conductive film 56 is partly exposed in the opening 62 (see FIG. 13B).

The insulating film 63 has a function of preventing entry of water or impurities from the outside. The insulating film 63 also serves as a dielectric of the capacitor 14 formed in a region where the conductive film 61 overlaps with the conductive film 64. The insulating film 63 is preferably formed using a nitride or a nitride oxide; for example, a silicon nitride film or a silicon nitride oxide film may be formed.

Figure 13C:
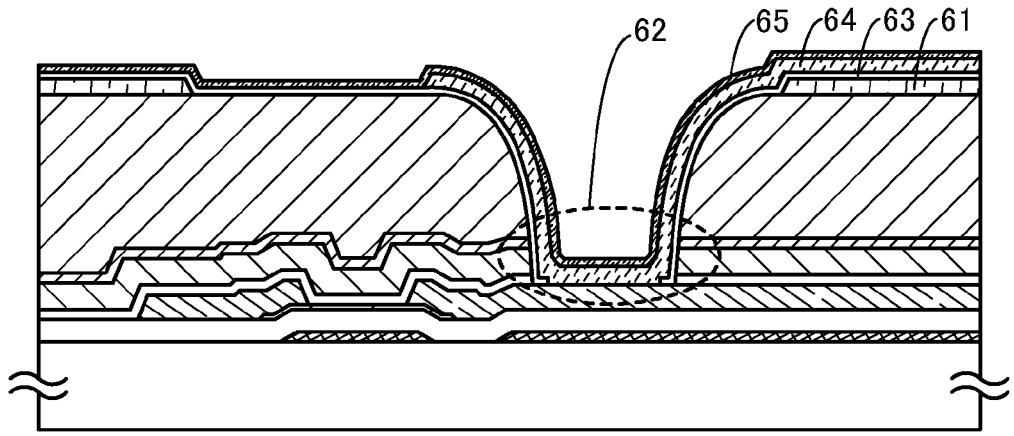

Next, a transparent conductive film is formed over the insulating film 63 and the shape thereof is processed by etching or the like, whereby the conductive film 64 is formed. The conductive film 64 is connected to the conductive film 56. Then, the alignment film 65 is formed over the conductive film 64 (see FIG. 13C).

As the transparent conductive film used for forming the conductive film 61 and the conductive film 64, a conductive film containing the following can be used: indium oxide containing tungsten oxide, indium zinc oxide containing tungsten oxide, indium oxide containing titanium oxide, indium tin oxide containing titanium oxide, indium tin oxide, indium zinc oxide, indium tin oxide to which silicon oxide is added, or the like.

Through the above steps, the element substrate illustrated in FIG. 10 can be obtained. After the element substrate is formed, a liquid crystal layer is sealed between the substrate 70 and the element substrate as illustrated in FIG. 11, whereby the panel of the liquid crystal display device is completed.

<Semiconductor Film>

A highly purified oxide semiconductor (a purified oxide semiconductor) obtained by reduction of impurities such as moisture or hydrogen that serve as electron donors (donors) and reduction of oxygen vacancies is an intrinsic (i-type) semiconductor or a substantially intrinsic semiconductor. Thus, a transistor including a channel formation region in a highly purified oxide semiconductor film has extremely low off-state current and high reliability.

Specifically, various experiments can prove low off-state current of a transistor including a channel formation region in a highly purified oxide semiconductor film. For example, even when an element has a channel width of $1\times10^6$ μm and a channel length of 10 μm, off-state current can be lower than or equal to the measurement limit of a semiconductor parameter analyzer, i.e., lower than or equal to $1\times10^{-13}$ A, at a voltage (drain voltage) between a source electrode and a drain electrode of 1 V to 10 V. In that case, it can be seen that off-state current normalized on the channel width of the transistor is lower than or equal to 100 zA/μm. In addition, a capacitor and a transistor were connected to each other and off-state current was measured using a circuit in which electric charge flowing to or from the capacitor is controlled by the transistor. In the measurement, a highly purified oxide semiconductor film was used for the channel formation region of the transistor, and the off-state current of the transistor was measured from a change in the amount of electric charge of the capacitor per unit hour. As a result, it was found that, in the case where the voltage between the source electrode and the drain electrode of the transistor is 3 V, a lower off-state current of several tens of yoctoamperes per micrometer is obtained. Accordingly, the transistor using the highly purified oxide semiconductor film for the channel formation region has much lower off-state current than a crystalline silicon transistor.

Unless otherwise specified, in the case of an n-channel transistor, the off-state current in this specification is a current that flows between a source and a drain when the potential of a gate is lower than or equal to 0 with the potential of the source as a reference potential while the potential of the drain is higher than those of the source and the gate. Meanwhile, in the case of a p-channel transistor, the off-state current in this specification is a current that flows between a source and a drain when the potential of a gate is higher than or equal to 0 with the potential of the source as a reference potential while the potential of the drain is lower than those of the source and the gate.

In the case where an oxide semiconductor film is used as the semiconductor film, at least indium (In) or zinc (Zn) is preferably included as an oxide semiconductor. The oxide semiconductor preferably contains, in addition to In and Zn, gallium (Ga) serving as a stabilizer that reduces variations in electrical characteristics among transistors using the above-described oxide semiconductor. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

Among the oxide semiconductors, unlike silicon carbide, gallium nitride, or gallium oxide, an In—Ga—Zn-based oxide, an In—Sn—Zn-based oxide, or the like has an advantage of high mass productivity because a transistor with favorable electrical characteristics can be formed by sputtering or a wet process. Further, unlike silicon carbide, gallium nitride, or gallium oxide, the In—Ga—Zn-based oxide allows a transistor with favorable electrical characteristics to be formed over a glass substrate. Further, a larger substrate can be used.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, any of the following oxides can be used, for example: indium oxide, gallium oxide, tin oxide, zinc oxide, In—Zn-based oxide, Sn—Zn-based oxide, Al—Zn-based oxide, Zn—Mg-based oxide, Sn—Mg-based oxide, In—Mg-based oxide, In—Ga-based oxide, In—Ga—Zn-based oxide (also referred to as IGZO), In—Al—Zn-based oxide, In—Sn—Zn-based oxide, Sn—Ga—Zn-based oxide, Al—Ga—Zn-based oxide, Sn—Al—Zn-based oxide, In—Hf—Zn-based oxide, In—La—Zn-based oxide, In—Pr—Zn-based oxide, In—Nd—Zn-based oxide, In—Sm—Zn-based oxide, In—Eu—Zn-based oxide, In—Gd—Zn-based oxide, In—Tb—Zn-based oxide, In—Dy—Zn-based oxide, In—Ho—Zn-based oxide, In—Er—Zn-based oxide, In—Tm—Zn-based oxide, In—Yb—Zn-based oxide, In—Lu—Zn-based oxide, In—Sn—Ga—Zn-based oxide, In—Hf—Ga—Zn-based oxide, In—Al—Ga—Zn-based oxide, In—Sn—Al—Zn-based oxide, In—Sn—Hf—Zn-based oxide, and In—Hf—Al—Zn-based oxide.

Note that, for example, an In—Ga—Zn-based oxide means an oxide containing In, Ga, and Zn, and there is no limitation on the ratio of In, Ga, and Zn. In addition, the In—Ga—Zn—O-based oxide may contain a metal element other than In, Ga, and Zn. Further, the In—Ga—Zn-based oxide may contain a metal element other than In, Ga, and Zn. The In—Ga—Zn-based oxide has sufficiently high resistance when no electric field is applied thereto, so that off-state current can be sufficiently reduced. Further, the In—Ga—Zn-based oxide has high mobility.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide with an atomic ratio close to the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide with an atomic ratio close to the above atomic ratios may be used.

For example, with an In—Sn—Zn-based oxide, high mobility can be realized relatively easily. However, even with an In—Ga—Zn-based oxide, mobility can be increased by reducing the defect density in the bulk.

An oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example of the amorphous oxide semiconductor film is an oxide semiconductor film in which no crystal part exists even in a microscopic region, and the whole of the film is amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit inside a cube whose one side is less than 100 nm. Thus, there is a case where a crystal part included in the CAAC-OS film fits inside a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100°, and accordingly includes the case where the angle is greater than or equal to 85° and less than or equal to 95°.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction substantially perpendicular to the c-axis, a peak appears frequently when 2θ is around 56°. This peak is derived from the (110) plane of the $InGaZnO_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface of the CAAC-OS film. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

In a transistor using the CAAC-OS film, change in electrical characteristics due to irradiation with visible light or ultraviolet light is small. Thus, the transistor has high reliability.

Note that an oxide semiconductor film may be a stacked film including two or more films of an amorphous oxide semiconductor film, a microcrystalline oxide semiconductor film, and a CAAC-OS film, for example.

For example, the CAAC-OS film is formed by a sputtering method using a polycrystalline metal oxide target. When ions collide with the target, a crystal region included in the target may be separated from the target along an a-b plane; in other words, a sputtered particle having a plane parallel to an a-b plane (flat-plate-like sputtered particle or pellet-like sputtered particle) may flake off from the target. In that case, the flat-plate-like or pellet-like sputtered particle reaches a substrate in the state of maintaining its crystal state, whereby the CAAC-OS film can be formed.

For the deposition of the CAAC-OS film, the following conditions are preferably used.

By reducing the amount of impurities entering the CAAC-OS film during the deposition, the crystal state can be prevented from being broken by the impurities. For example, the concentration of impurities (e.g., hydrogen, water, carbon dioxide, and nitrogen) which exist in the treatment chamber may be reduced. Furthermore, the concentration of impurities in a deposition gas may be reduced. Specifically, a deposition gas whose dew point is −80° C. or lower, preferably −100° C. or lower is used.

By increasing the substrate heating temperature during the deposition, migration of a sputtered particle is likely to occur after the sputtered particle reaches a substrate surface. Specifically, the substrate heating temperature during the deposition is from 100° C. to 740° C., preferably from 200° C. to 500° C. By increasing the substrate heating temperature during the deposition, when the flat-plate-like or pellet-like sputtered particle reaches the substrate, migration occurs on the substrate surface, so that a flat plane of the sputtered particles is attached to the substrate.

Furthermore, it is preferable that the proportion of oxygen in the deposition gas be increased and the power be optimized in order to reduce plasma damage at the deposition. The proportion of oxygen in the deposition gas is 30 vol % or higher, preferably 100 vol %.

As an example of the target, an In—Ga—Zn-based oxide target is described below.

The In—Ga—Zn-based oxide target, which is polycrystalline, is made as follows: $InO_X$ powder, $GaO_Y$ powder, and $ZnO_X$ powder are mixed in a predetermined molar ratio, pressure is applied to the mixture, and heat treatment is performed at a temperature from 1000° C. to 1500° C. Note that X, Y, and Z are each a given positive number. Here, the predetermined molar ratio of $InO_X$ powder to $GaO_Y$ powder and $ZnO_Z$ powder is, for example, 2:2:1, 8:4:3, 3:1:1, 1:1:1, 4:2:3, or 3:1:2. The kinds of powder and the molar ratio for mixing powder may be determined as appropriate depending on a desired target.

Figure 14:
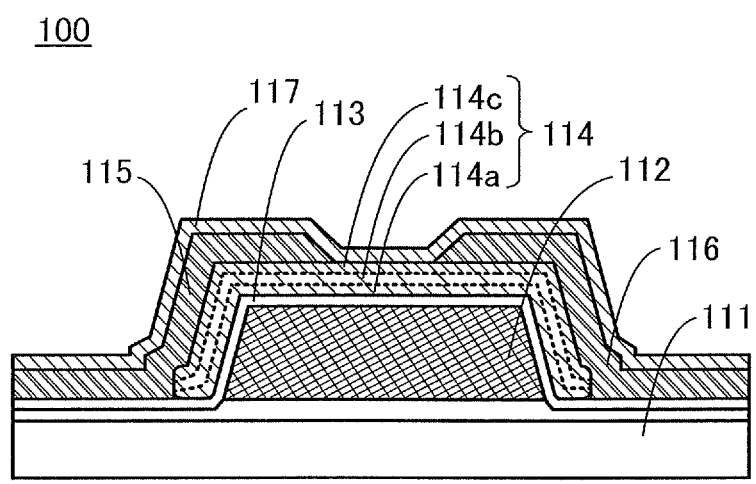
FIG. 14 is a cross-sectional view of a transistor.

The semiconductor film is not limited to a single-layer oxide semiconductor film and may have a layered structure of a plurality of oxide semiconductor films. FIG. 14 shows an example of the structure of a transistor 100 including a three-layer oxide semiconductor film.

The transistor 100 illustrated in FIG. 14 includes, over a substrate 111 having an insulating surface, a conductive film 112 serving as a gate electrode, a gate insulating film 113 over the conductive film 112, a semiconductor film 114 over the conductive film 112 with the gate insulating film 113 interposed therebetween, and a conductive film 115 and a conductive film 116 which are in contact with the semiconductor film 114 and serve as a source or a drain.

In FIG. 14, an oxide film 117 is provided over the semiconductor film 114, the conductive film 115, and the conductive film 116. In one embodiment of the present invention, the oxide film 117 may be included in the constituent elements of the transistor 100.

In the transistor 100, oxide semiconductor films 114a to 114c are stacked in order from the side of the conductive film 112 serving as the gate electrode.

The oxide semiconductor films 114a and 114c are each an oxide film which contains at least one of the metal elements contained in the oxide semiconductor film 114b and whose energy at a bottom of conduction band is closer to the vacuum level than that of the oxide semiconductor film 114b by higher than or equal to 0.05 eV, 0.07 eV, 0.1 eV, or 0.15 eV and lower than or equal to 2 eV, 1 eV, 0.5 eV, or 0.4 eV. Further, the oxide semiconductor film 114b preferably contains at least indium in order to increase the carrier mobility.

In the transistor 100 having the above structure, when a voltage is applied to the conductive film 112 serving as the gate electrode so that an electric field is applied to the semiconductor film 114, a channel region is formed in the oxide semiconductor film 114b whose energy at the bottom of the conduction band is small in the semiconductor film 114. That is, since the oxide semiconductor film 114c is provided between the oxide semiconductor film 114b and the gate insulating film 113, a channel region can be formed in the oxide semiconductor film 114b which is insulated from the gate insulating film 113.

Since the oxide semiconductor film 114c contains at least one of the metal elements contained in the oxide semiconductor film 114b, interface scattering is unlikely to occur at the interface between the oxide semiconductor film 114b and the oxide semiconductor film 114c. Thus, the movement of carriers is unlikely to be inhibited at the interface, which results in an increase in the field-effect mobility of the transistor 100.

Further, when an interface level is formed at the interface between the oxide semiconductor film 114b and the oxide semiconductor film 114a, a channel region is formed also in the vicinity of the interface, which causes a change in the threshold voltage of the transistor 100. However, since the oxide semiconductor film 114a contains at least one of the metal elements contained in the oxide semiconductor film 114b, an interface level is unlikely to be formed at the interface between the oxide semiconductor film 114b and the oxide semiconductor film 114a. Accordingly, the above structure allows reducing of variations in the electrical characteristics of the transistor 100, such as the threshold voltage.

Further, it is preferable that a plurality of oxide semiconductor films be stacked so that an interface level due to an impurity existing between the oxide semiconductor films, which inhibits carrier flow, is not formed at the interface between the oxide semiconductor films. This is because when an impurity exists between the stacked oxide semiconductor films, the continuity of the energy at the bottom of the conduction band between the oxide semiconductor films is lost, and carriers are trapped or disappear by recombination in the vicinity of the interface. By reducing an impurity existing between the films, a continuous junction (here, in particular, a U-shape well structure whose energy at the bottom of the conduction band is changed continuously between the films) is formed more easily than the case of merely stacking a plurality of oxide semiconductor films which share at least one main metal component.

To form the continuous junction, each film needs to be stacked successively without exposure to the atmosphere using a multi-chamber deposition apparatus (sputtering apparatus) including a load lock chamber. Each chamber in the sputtering apparatus is preferably subjected to high vacuum evacuation (to a vacuum of about $5 \times 10^{-7}$ Pa to $1 \times 10^{-4}$ Pa) with use of a suction vacuum evacuation pump such as a cryopump so that water or the like, which is an impurity for the oxide semiconductor, is removed as much as possible. Alternatively, a turbo-molecular pump is preferably used in combination with a cold trap to prevent backflow of gas into the chamber through an evacuation system.

To obtain a highly purified intrinsic oxide semiconductor, a chamber needs to be subjected to high vacuum evacuation, and in addition, a sputtering gas needs to be highly purified. When a highly purified oxygen gas or argon gas having a dew point of −40° C. or lower, preferably −80° C. or lower, and more preferably −100° C. or lower is used as the sputtering gas, moisture or the like can be prevented from entering the oxide semiconductor film as much as possible.

The oxide semiconductor film 114a or 114c may be an oxide film containing aluminum, silicon, titanium, gallium, germanium, yttrium, zirconium, tin, lanthanum, cerium, or hafnium at a higher atomic ratio than the oxide semiconductor film 114b. Specifically, the oxide semiconductor film 114a or 114c may be an oxide film containing the above element at an atomic ratio 1.5 times or more, preferably twice or more, and more preferably three times or more that in the oxide semiconductor film 114b. The above element is strongly bonded to oxygen and thus has a function of suppressing generation of oxygen vacancies in the oxide film. That is, oxygen vacancies are less likely to be generated in the oxide semiconductor film 114a or 114c than in the oxide semiconductor film 114b.

Specifically, when both the oxide semiconductor film 114b and the oxide semiconductor film 114a or 114c include an In-M-Zn-based oxide, the atomic ratio of the oxide semiconductor film 114a or 114c, In:M:Zn=$x_1$:$y_1$:$z_1$, and the atomic ratio of the oxide semiconductor film 114b, In:M:Zn=$x_2$:$y_2$:$z_2$, may be determined so that $y_1/x_1$ is larger than $y_2/x_2$. Note that the element M is a metal element which has a higher ability than In to bind to oxygen, examples of which include Al, Ti, Ga, Y, Zr, Sn, La, Ce, Nd, and Hf The atomic ratio is preferably determined so that $y_1/x_1$ is 1.5 or more times $y_2/x_2$. More preferably, the atomic ratio is determined so that $y_1/x_1$ is 2 or more times $y_2/x_2$. Still more preferably, the atomic ratio is determined so that $y_1/x_1$ is 3 or more times $y_2/x_2$. Further, it is preferable that $y_1$ be greater than or equal to $x_1$ in the oxide semiconductor film 114b, in which case the transistor 100 can have stable electrical characteristics. Note that $y_1$ is preferably less than 3 times $x_1$ because the field-effect mobility of the transistor 100 is lowered if $y_1$ is 3 or more times $x_1$.

The oxide semiconductor film 114a and the oxide semiconductor film 114c each have a thickness of 3 nm to 100 nm, preferably 3 nm to 50 nm. The oxide semiconductor film 114b has a thickness of 3 nm to 200 nm, preferably 3 nm to 100 nm, and more preferably 3 nm to 50 nm.

In the three-layer semiconductor film, the oxide semiconductor films 114a and 114c can be amorphous or crystalline. Note that the oxide semiconductor film 114b in which a channel region is formed preferably has a crystalline structure, in which case the transistor 100 can have stable electrical characteristics.

Note that a channel formation region refers to a region of a semiconductor film of a transistor, which overlaps with a gate electrode and which is between a source electrode and a drain electrode. Further, a channel region refers to a region through which current mainly flows in the channel formation region.

For example, in the case where an In—Ga—Zn-based oxide film formed by a sputtering method is used as each of the oxide semiconductor films 114a and 114c, the oxide semiconductor films 114a and 114c can be deposited with use of an In—Ga—Zn-based oxide target (In:Ga:Zn=1:3:2 [atomic ratio]). The deposition conditions can be as follows: an argon gas (flow rate: 30 sccm) and an oxygen gas (flow rate: 15 sccm) are used as the deposition gas; the pressure is 0.4 Pa; the substrate temperature is 200° C.; and the DC power is 0.5 kW.

Further, in the case where the oxide semiconductor film 114b is a CAAC-OS film, the oxide semiconductor film 114b is preferably deposited with use of a polycrystalline In—Ga—Zn-based oxide target containing In, Ga, and Zn at an atomic ratio of 1:1:1. The deposition conditions can be as follows: an argon gas (flow rate: 30 sccm) and an oxygen gas (flow rate: 15 sccm) are used as the deposition gas; the pressure is 0.4 Pa; the substrate temperature is 300° C.; and the DC power is 0.5 kW.

Although the oxide semiconductor film described above can be formed by a sputtering method, such film may be formed by another method, e.g., a thermal CVD method. A metal organic chemical vapor deposition (MOCVD) method or an atomic layer deposition (ALD) method may be employed as an example of a thermal CVD method.

A thermal CVD method has an advantage that no defect due to plasma damage is generated since it does not utilize plasma for forming a film.

Deposition by a thermal CVD method may be performed in such a manner that a source gas and an oxidizer are supplied to the chamber at a time, the pressure in a chamber is set to an atmospheric pressure or a reduced pressure, and reaction is caused in the vicinity of the substrate or over the substrate.

For example, in the case where an In—Ga—Zn—O film is formed, trimethylindium, trimethylgallium, and dimethylzinc are used. Note that the chemical formula of trimethylindium is In(CH$_3$)$_3$. The chemical formula of trimethylgallium is Ga(CH$_3$)$_3$. The chemical formula of dimethylzinc is Zn(CH$_3$)$_2$. Without limitation to the above combination, triethylgallium (chemical formula: Ga(C$_2$H$_5$)$_3$) can be used instead of trimethylgallium and diethylzinc (chemical formula: Zn(C$_2$H$_5$)$_2$) can be used instead of dimethylzinc.

For example, in the case where an oxide semiconductor film, e.g., an In—Ga—Zn—O film is formed using a deposition apparatus employing ALD, an In(CH$_3$)$_3$ gas and an O$_3$ gas are sequentially introduced plural times to form an In—O layer, a Ga(CH$_3$)$_3$ gas and an O$_3$ gas are introduced at a time to form a Ga—O layer, and then a Zn(CH$_3$)$_2$ gas and an O$_3$ gas are introduced at a time to form a Zn—O layer. Note that the order of these layers is not limited to this example. A mixed compound layer such as an In—Ga—O layer, an In—Zn—O layer, or a Ga—Zn—O layer may be formed by mixing of these gases. Note that although an H$_2$O gas which is obtained by bubbling with an inert gas such as Ar may be used instead of an O$_3$ gas, it is preferable to use an O$_3$ gas, which does not contain H. Further, instead of an In(CH$_3$)$_3$ gas, an In(C$_2$H$_5$)$_3$ gas may be used. Instead of a Ga(CH$_3$)$_3$ gas, a Ga(C$_2$H$_5$)$_3$ gas may be used. Instead of an In(CH$_3$)$_3$ gas, an In(C$_2$H$_5$)$_3$ may be used. Furthermore, a Zn(CH$_3$)$_2$ gas may be used.

Note that in the transistor 100 illustrated in FIG. 14, the edge of the semiconductor film 114 may be tapered or rounded.

Although the semiconductor film 114 in FIG. 14 is a stack of three oxide semiconductor films, the semiconductor film 114 may be a stack of two or four or more oxide semiconductor films.

Note that in the case where the semiconductor film 114 is a stack of plural oxide semiconductor films, the oxide film 117 includes a metal oxide with conductivity lower than that of the entire semiconductor film 114. For example, in the case where an In—Ga—Zn-based oxide is used as the metal oxide of the oxide film 117, the atomic ratio of In in the metal oxide is lower than that in the semiconductor film 114.

As in the case of the transistor 12 illustrated in FIG. 15, a region of the semiconductor film 114 that is in contact with the conductive films 115 and 116 may be an n-type semiconductor region. Such a structure increases the mobility and on-state current of the transistor 100 and achieves high-speed operation of a liquid crystal display device using the transistor 100. Furthermore, in the case of the transistor 100, the n-type semiconductor region preferably reaches the oxide semiconductor film 114b which is to be a channel region, in which case the mobility and on-state current of the transistor 100 is further increased and higher-speed operation of the liquid crystal display device is achieved.

<Top View and Cross-Sectional View of Liquid Crystal Display Device>

Figure 16A:
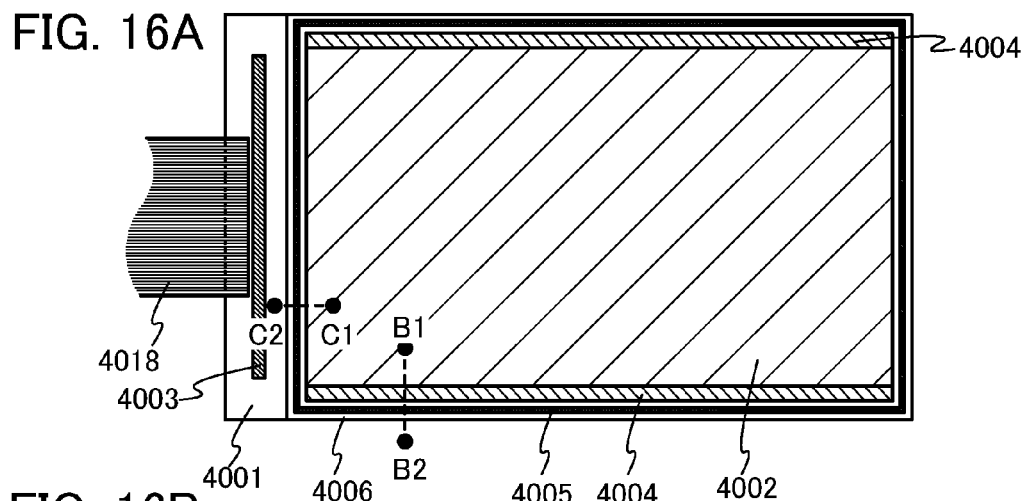
FIG. 16A is a top view of a liquid crystal display device.
Figure 16B:
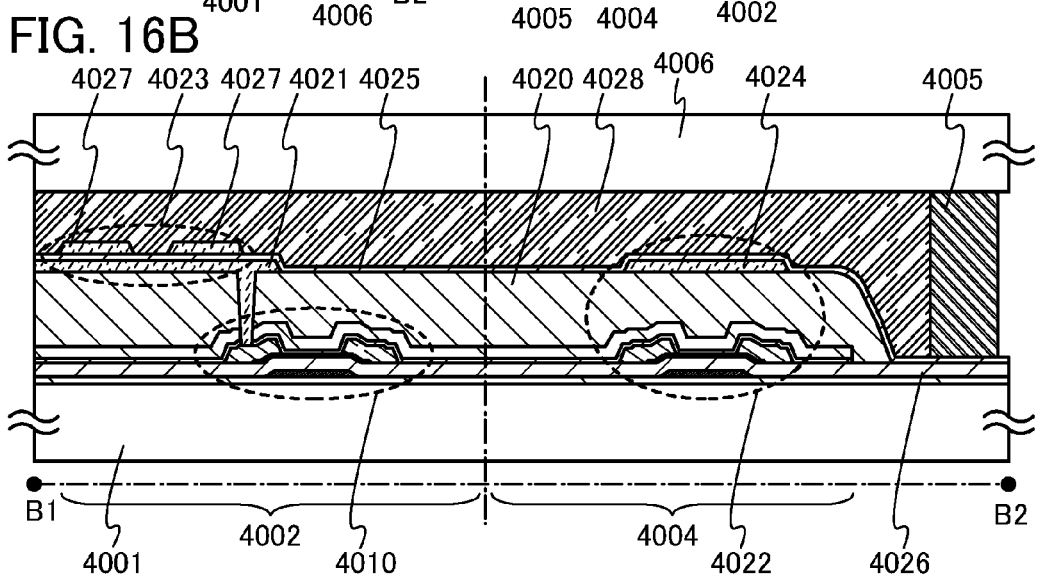
FIGS. 16B and 16C are cross-sectional views of the same.
Figure 16C:
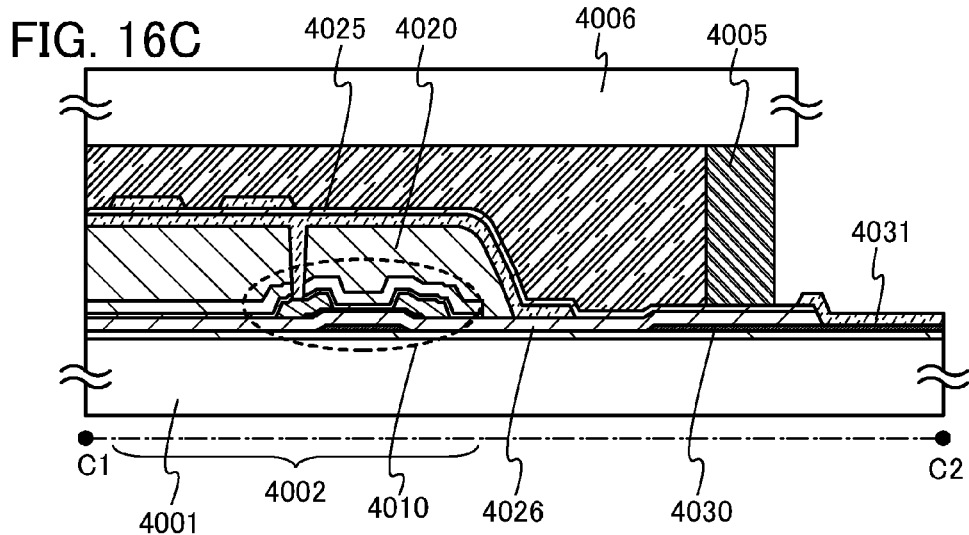

The appearance of a liquid crystal display device of one embodiment of the present invention will be described with reference to FIGS. 16A to 16C. FIG. 16A is a top view of the liquid crystal display device where a substrate 4001 and a substrate 4006 are bonded to each other with a sealant 4005. FIG. 16B corresponds to a cross-sectional view taken along dashed line B1-B2 in FIG. 16A. FIG. 16C corresponds to a cross-sectional view taken along dashed line C1-C2 in FIG. 16A. Note that FIGS. 16A to 16C illustrate a fringe field switching (FFS) mode liquid crystal display device.

The sealant 4005 is provided to surround a pixel portion 4002 and a pair of driver circuits 4004 provided over the substrate 4001. The substrate 4006 is provided over the pixel portion 4002 and the driver circuits 4004. Thus, the pixel portion 4002 and the driver circuits 4004 are sealed by the substrate 4001, the sealant 4005, and the substrate 4006.

A driver circuit 4003 is mounted in a region which is different from the region surrounded by the sealant 4005 over the substrate 4001.

A plurality of transistors are included in the pixel portion 4002 and the driver circuits 4004 provided over the substrate 4001. FIG. 16B illustrates a transistor 4010 included in the pixel portion 4002 and a transistor 4022 included in the driver circuit 4004. FIG. 16C illustrates the transistor 4010 included in the pixel portion 4002.

In the pixel portion 4002 and the driver circuit 4004, an insulating film 4020 formed using a resin is provided over the transistor 4010 and the transistor 4022. A pixel electrode 4021 of a liquid crystal element 4023 and a conductive film 4024 are provided over the insulating film 4020. The conductive film 4024 can function as a discharge path for electric charge accumulated in the insulating film 4020. Alternatively, the conductive film 4024 and the insulating film 4020 can be included as components of the transistor 4022, and the conductive film 4024 can function as a back gate.

An insulating film 4025 is provided over the insulating film 4020, the pixel electrode 4021, and the conductive film 4024. The insulating film 4025 preferably has a high effect of blocking diffusion of water, hydrogen, and the like. As the insulating film 4025, a silicon nitride film, a silicon nitride oxide film, or the like can be used.

As illustrated in FIGS. 16B and 16C, in one embodiment of the present invention, the insulating film 4020 is removed at an end of the panel. The insulating film 4025 over the insulating film 4020 is in contact with an insulating film 4026 serving as a gate insulating film of the transistors 4010 and 4022 between the sealant 4005 and the substrate 4001.

In the case where the insulating film 4025 and the insulating film 4026 each have a high effect of blocking diffusion of water, hydrogen, and the like, when the insulating film 4025 is in contact with the insulating film 4026 at the end of the panel, water, hydrogen, and the like can be prevented from entering from the end of the panel or the sealant 4005 into semiconductor films of the transistors 4010 and 4022.

A common electrode 4027 of the liquid crystal element 4023 is provided over the insulating film 4025. A liquid crystal layer 4028 is provided between the common electrode 4027 and the insulating film 4025, and the substrate 4006. The liquid crystal element 4023 includes the pixel electrode 4021, the common electrode 4027, and the liquid crystal layer 4028.

The transmittance of the liquid crystal element 4023 changes when the alignment of liquid crystal molecules included in the liquid crystal layer 4028 changes in accordance with the level of a voltage applied between the pixel electrode 4021 and the common electrode 4027. Accordingly, when the transmittance of the liquid crystal element 4023 is controlled by the potential of an image signal supplied to the pixel electrode 4021, gray-scale images can be displayed.

The liquid crystal display device of one embodiment of the present invention may display a color image by using a color filter or may display a color image by sequentially turning on a plurality of light sources whose hues are different from each other.

Image signals from the driver circuit 4003 and a variety of control signals and power supply potentials from an FPC 4018 are supplied to the driver circuits 4004 or the pixel portion 4002 through lead wirings 4030 and 4031.

<Examples of Structures of Electronic Devices Using Liquid Crystal Display Device>

The liquid crystal display device of one embodiment of the present invention can be used for display devices, personal computers, or image reproducing devices provided with recording media (typically, devices that reproduce the content of recording media such as digital versatile discs (DVDs) and have displays for displaying the reproduced images). Other examples of the electronic devices to which the liquid crystal display device of one embodiment of the present invention can be applied include cellular phones, game machines (including portable game machines), personal digital assistants, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATMs), and vending machines. FIGS. 18A to 18F illustrate specific examples of these electronic devices.

Figure 18A:
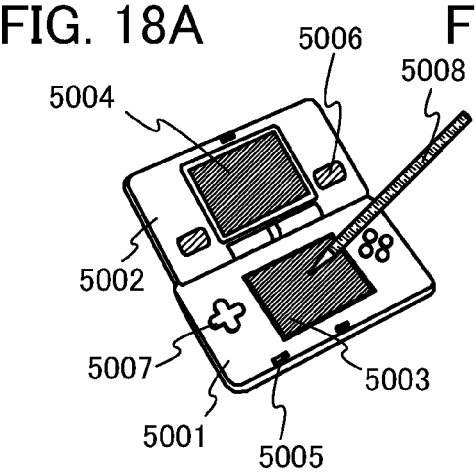
FIGS. 18A to 18F illustrate electronic devices.

FIG. 18A illustrates a portable game machine, which includes a housing 5001, a housing 5002, a display portion 5003, a display portion 5004, a microphone 5005, speakers 5006, an operation key 5007, a stylus 5008, and the like. The liquid crystal display device of one embodiment of the present invention can be used for the display portion 5003 or the display portion 5004. Note that although the portable game machine in FIG. 18A has the two display portions 5003 and 5004, the number of display portions included in the portable game machine is not limited thereto.

Figure 18B:
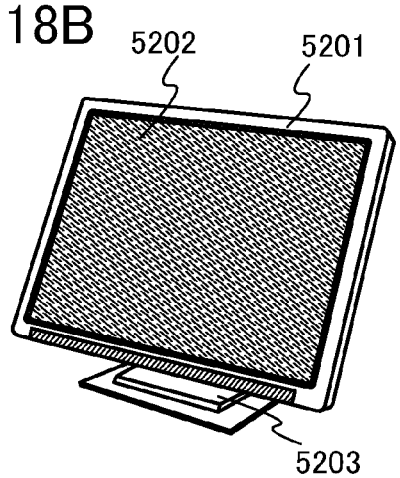

FIG. 18B illustrates a display device, which includes a housing 5201, a display portion 5202, a support 5203, and the like. The liquid crystal display device of one embodiment of the present invention can be used for the display portion 5202. Note that the display device means all display devices for displaying information, such as display devices for personal computers, for receiving TV broadcast, and for displaying advertisements.

Figure 18C:
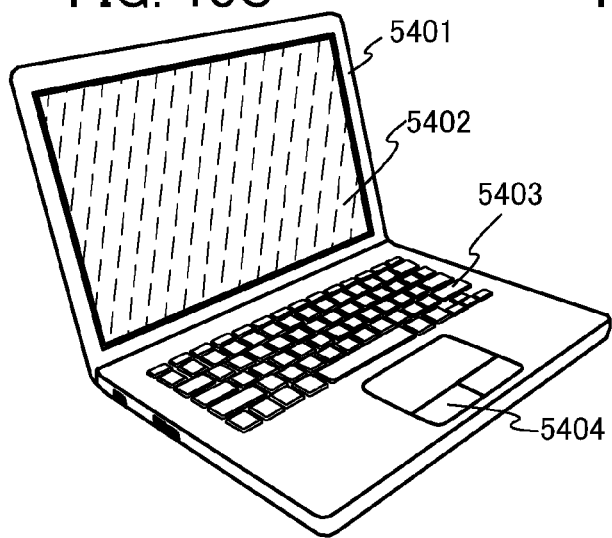

FIG. 18C illustrates a laptop personal computer, which includes a housing 5401, a display portion 5402, a keyboard 5403, a pointing device 5404, and the like. The liquid crystal display device of one embodiment of the present invention can be used for the display portion 5402.

Figure 18D:
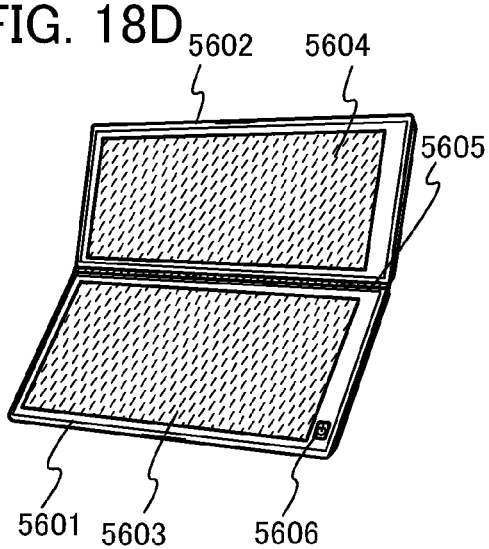

FIG. 18D illustrates a personal digital assistant, which includes a first housing 5601, a second housing 5602, a first display portion 5603, a second display portion 5604, a joint

5605, an operation key 5606, and the like. The first display portion 5603 is provided in the first housing 5601, and the second display portion 5604 is provided in the second housing 5602. The first housing 5601 and the second housing 5602 are connected to each other with the joint 5605, and the angle between the first housing 5601 and the second housing 5602 can be changed with the joint 5605. An image on the first display portion 5603 may be switched depending on the angle between the first housing 5601 and the second housing 5602 at the joint 5605. The liquid crystal display device of one embodiment of the present invention can be used for the first display portion 5603 or the second display portion 5604. A liquid crystal display device with a position input function may be used as at least one of the first display portion 5603 and the second display portion 5604. Note that the position input function can be added by provision of a touch panel in a liquid crystal display device. Alternatively, the position input function can be added by provision of a photoelectric conversion element also called a photosensor in a pixel portion of a liquid crystal display device.

Figure 18E:
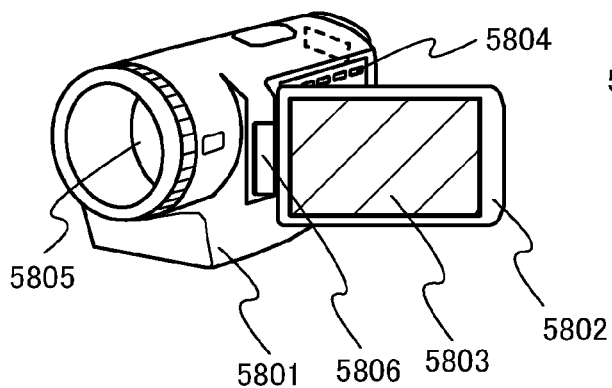

FIG. 18E illustrates a video camera, which includes a first housing 5801, a second housing 5802, a display portion 5803, operation keys 5804, a lens 5805, a joint 5806, and the like. The operation keys 5804 and the lens 5805 are provided in the first housing 5801, and the display portion 5803 is provided in the second housing 5802. The first housing 5801 and the second housing 5802 are connected to each other with the joint 5806, and the angle between the first housing 5801 and the second housing 5802 can be changed with the joint 5806. An image on the display portion 5803 may be switched depending on the angle between the first housing 5801 and the second housing 5802 at the joint 5806. The liquid crystal display device of one embodiment of the present invention can be used for the display portion 5803.

Figure 18F:
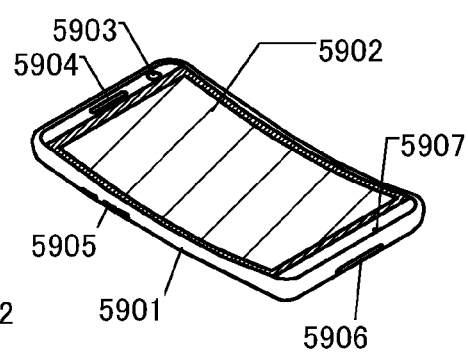

FIG. 18F illustrates a cellular phone. In the cellular phone, a display portion 5902, a microphone 5907, a speaker 5904, a camera 5903, an external connection portion 5906, and an operation button 5905 are provided in a housing 5901. The liquid crystal display device of one embodiment of the present invention can be used for a circuit included in the cellular phone. In the case where the liquid crystal display device of one embodiment of the present invention is formed over a flexible substrate, it can be applied to the display portion 5902 having a curved surface as shown in FIG. 18F.

<Comparison Between Voltage Holding Rate and Transmittance>

It is known that an IPS mode liquid crystal element has a higher voltage holding rate than a vertical electric field mode liquid crystal element, such as a TN mode, in which the vertical electric field is applied to a liquid crystal layer. This is probably because the capacitance of a glass substrate is electrically connected in parallel to the liquid crystal layer. The same effect is probably produced in an FFS mode which is also the horizontal electric field mode as the IPS mode. Note that in a horizontal electric field mode liquid crystal display device including a pair of substrates which are arranged with a liquid crystal layer interposed therebetween, both a pixel electrode and a common electrode are provided on one of the substrates where transistors are manufactured, and a substantially horizontal electric field is applied to a liquid crystal molecule.

Figure 19A:
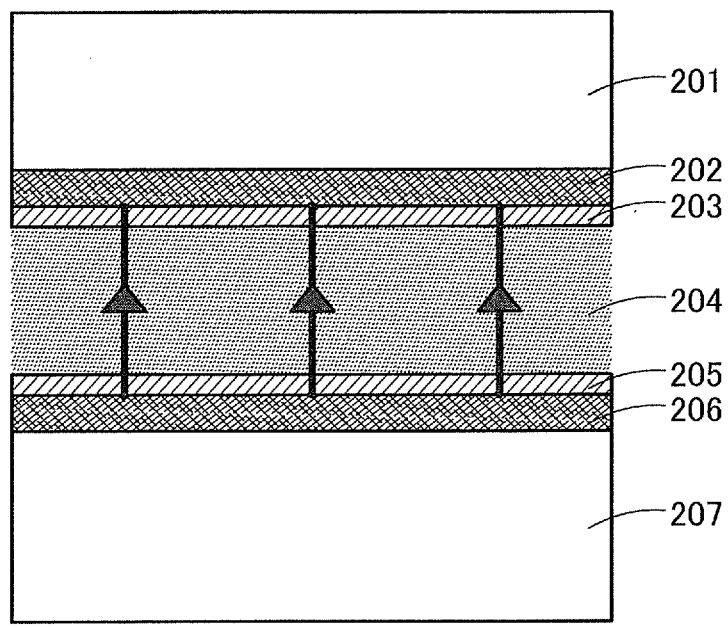
FIGS. 19A and 19B respectively illustrate a cross-sectional structure and an equivalent circuit of a liquid crystal element.
Figure 19B:
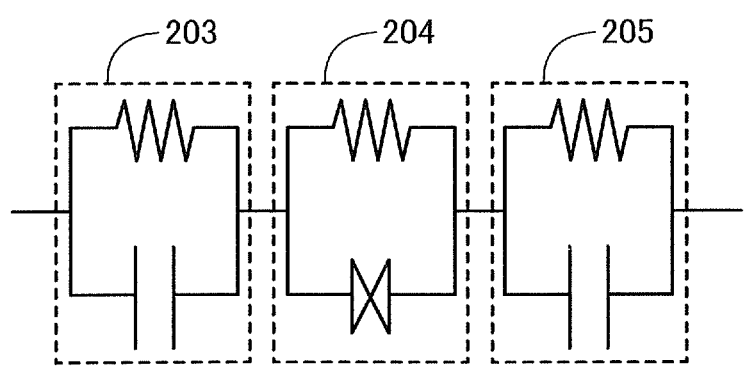
Figure 20A:
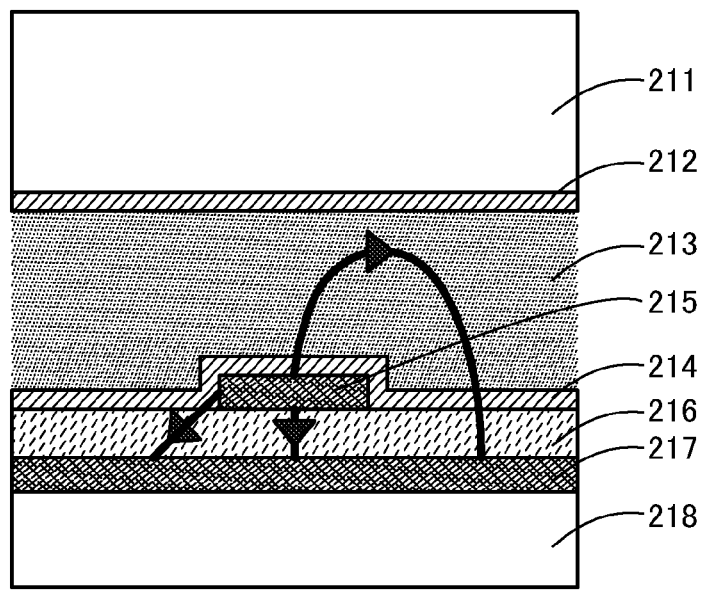
FIGS. 20A and 20B respectively illustrate a cross-sectional structure and an equivalent circuit of a liquid crystal element.
Figure 20B:
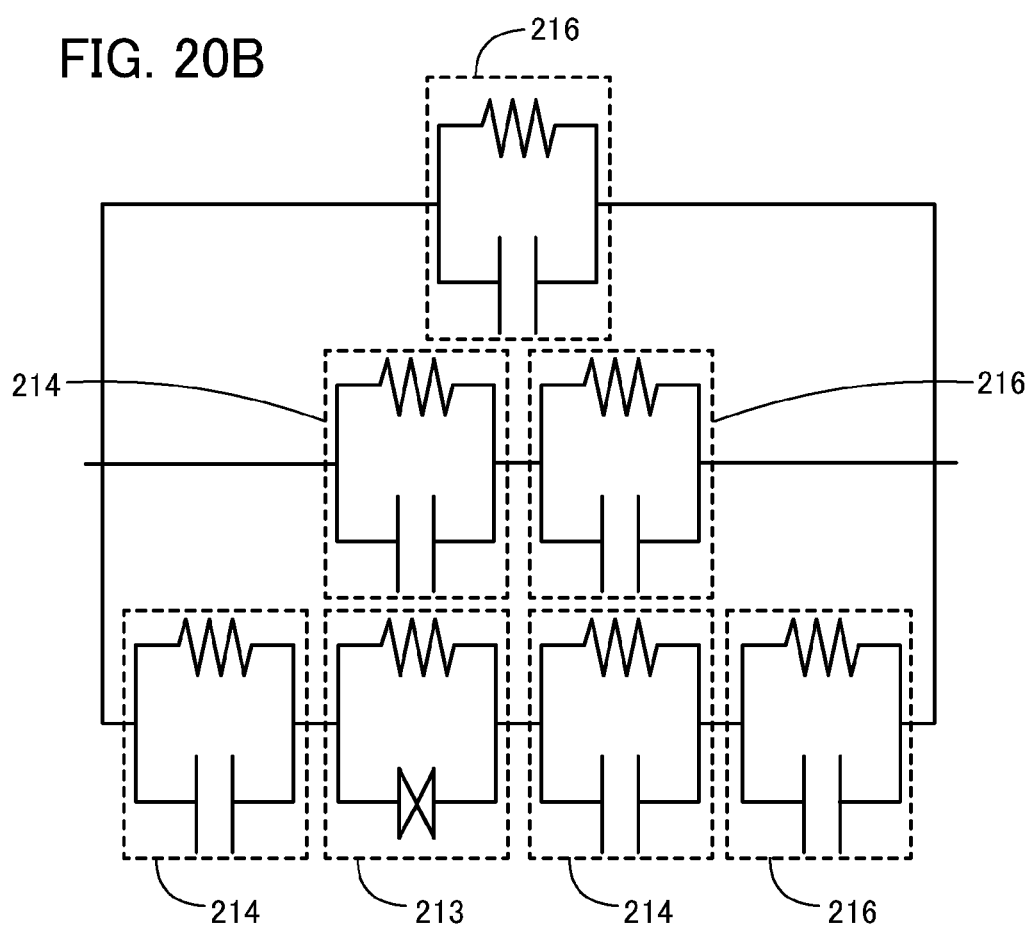

FIG. 19A schematically shows a cross-sectional structure of a TN mode liquid crystal element, and FIG. 19B shows an equivalent circuit diagram corresponding to the cross-sectional structure shown in FIG. 19A. FIG. 20A schematically shows a cross-sectional structure of an FFS mode liquid crystal element, and FIG. 20B shows an equivalent circuit diagram corresponding to the cross-sectional structure shown in FIG. 20A.

In FIG. 19A, an electrode 202 is provided on a substrate 201, and an alignment film 203 is provided on the electrode 202. Further, an electrode 206 is provided over a substrate 207, and an alignment film 205 is provided over the electrode 206. A liquid crystal layer 204 is provided between the alignment film 203 and the alignment film 205. When a voltage is applied between the electrode 202 and the electrode 206, an electric field is generated in a direction denoted by arrows.

In the case of the TN mode liquid crystal element having the cross-sectional structure illustrated in FIG. 19A, as illustrated in FIG. 19B, the alignment film 203, the liquid crystal layer 204, and the alignment film 205 are electrically connected in series successively between the electrode 202 and the electrode 206.

In FIG. 20A, an alignment film 212 is provided on a substrate 211. An electrode 217 is provided over a substrate 218, an insulating film 216 is provided over the electrode 217, an electrode 215 is provided over the insulating film 216 so as to overlap with part of the electrode 217, and an alignment film 214 is provided over the electrode 215 and the electrode 217. A liquid crystal layer 213 is provided between the alignment film 212 and the alignment film 214. When a voltage is applied between the electrode 217 and the electrode 215, an electric field is generated in a direction denoted by arrows.

In the case of the FFS mode liquid crystal element having the cross-sectional structure illustrated in FIG. 20A, as illustrated in FIG. 20B, the insulating film 216 is electrically connected between the electrode 215 and the electrode 217. Further, the alignment film 214 and the insulating film 216 are electrically connected in series successively between the electrode 215 and the electrode 217. Moreover, the alignment film 214, the liquid crystal layer 213, the alignment film 214, and the insulating film 216 are electrically connected in series successively between the electrode 215 and the electrode 217.

FIG. 20B shows that in the FFS mode liquid crystal element, an area in which the insulating film 216 is sandwiched between the electrode 215 and the electrode 217 serves as a capacitor and the capacitor is electrically connected in parallel to the liquid crystal layer 213. This shows that the FFS mode liquid crystal element has a higher voltage holding rate than the TN mode liquid crystal element.

Figure 21:
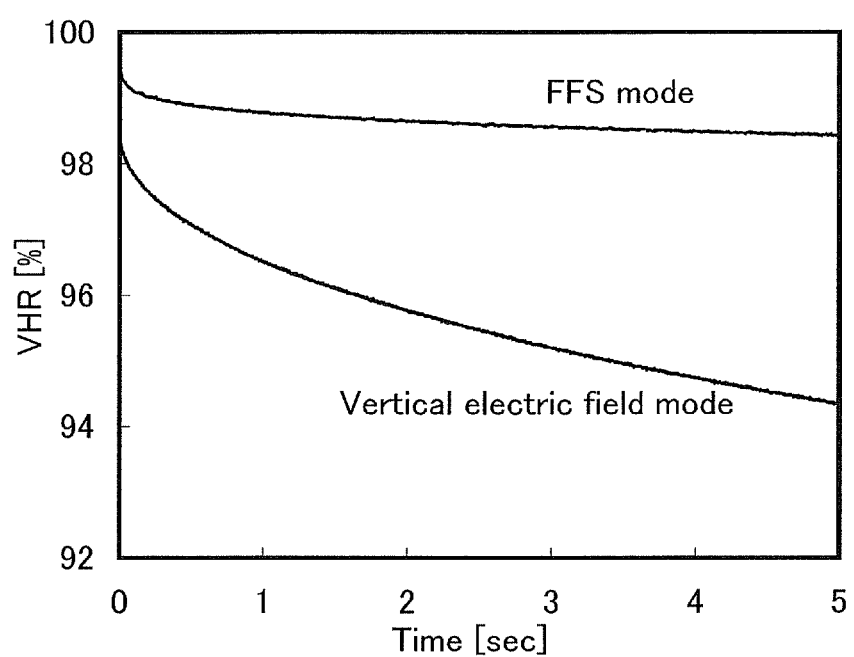
FIG. 21 is a graph showing the relationship between time and voltage holding rate.

Then, FIG. 21 shows the measurement results of a change with time of the voltage holding rate VHR (%) of a vertical electric field mode liquid crystal element and an FFS mode liquid crystal element. Note that the vertical electric field mode liquid crystal element has a structure in which a liquid crystal layer including a nematic liquid crystal is sandwiched between a pair of electrodes and no alignment film is provided. The FFS mode liquid crystal element has a structure in which a pair of electrodes partly overlap with each other with an insulating film interposed therebetween and no alignment film is provided. In the measurement, the substrate temperature was set to 30° C. and a voltage higher than the threshold voltage of the liquid crystal layer was applied between the pair of electrodes at the start of measurement.

As shown in FIG. 21, it was found that a change with time of the voltage holding rate VHR (%) was smaller in the FFS mode liquid crystal element than in the vertical electric field mode liquid crystal element. This shows that, in the horizontal electric field mode liquid crystal display device, such as the FFS mode, the amount of change in transmittance is smaller than that in the vertical electric field mode liquid crystal element, such as the TN mode, and the perception of flicker due to variation in the transmittance can be prevented.

Figure 22:
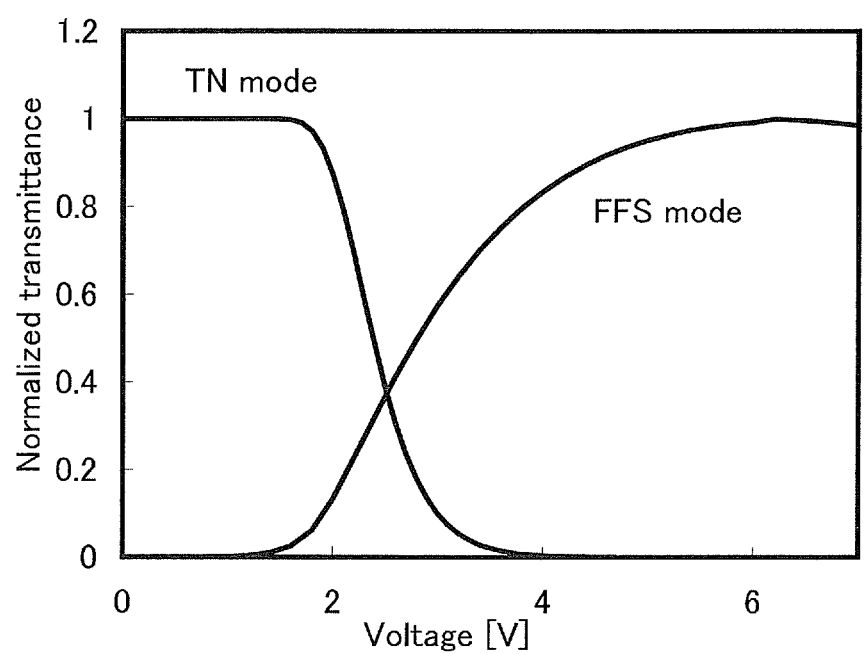
FIG. 22 is a graph showing the relationship between voltage and normalized transmittance.

Next, FIG. 22 shows the calculation results of the transmittance of the TN mode liquid crystal element and the FFS mode liquid crystal element. The materials for the alignment film and the liquid crystal layer were the same in the two liquid crystal elements. The cell gap was controlled so that the maximum transmittance could be obtained in each of the liquid crystal elements. In the calculation, the aperture ratio of a pixel is not taken into consideration. FIG. 22 shows the transmittance (normalized transmittance) standardized so that the maximum transmittance of each liquid crystal element is 1; actually, the TN mode liquid crystal element and the FFS mode liquid crystal element had about the same maximum transmittance also in the measured value.

FIG. 22 shows that the slope of a line representing a change in transmittance with respect to voltage is more gradual in the FFS mode liquid crystal element, which means that a change in gray scale with a change in the voltage $V_{LC}$ applied to the liquid crystal element can be reduced. Although the FFS mode liquid crystal element has a higher saturation voltage than the TN mode liquid crystal element, the FFS mode panel has a higher aperture ratio of pixel and thus a smaller light loss within the panel, resulting in lower power consumption.

In addition, the FFS mode panel which is the horizontal electric field mode panel is advantageous in that it can withstand pressure, and thus is suitable for a liquid crystal display device including a touch panel.

This application is based on Japanese Patent Application serial No. 2012-262538 filed with Japan Patent Office on Nov. 30, 2012, the entire contents of which are hereby incorporated by reference.

What is claimed is:

1. A liquid crystal display device comprising:
a pixel comprising:
a transistor;
a liquid crystal element including a pixel electrode, a common electrode, and a liquid crystal layer over the pixel electrode and the common electrode, wherein a first signal and a second signal having opposite polarities are alternately supplied to the pixel electrode through the transistor, and wherein a fixed potential is supplied to the common electrode; and
a capacitor including a first electrode and a second electrode,
wherein the pixel electrode and the common electrode partly overlap with each other with an insulating film interposed therebetween,
wherein the first electrode is electrically connected to the pixel electrode, and
wherein the second electrode is connected to a wiring to which a potential which changes between a first potential and a second potential is applied.

2. The liquid crystal display device according to claim 1, wherein the transistor includes an oxide semiconductor film.

3. The liquid crystal display device according to claim 2, wherein the oxide semiconductor film comprises indium, gallium, and zinc.

4. The liquid crystal display device according to claim 1, wherein, as the potential, a potential with triangle waveform is applied to the wiring.

5. The liquid crystal display device according to claim 1, wherein the first signal and the second signal are configured to be used for one of frame inversion driving, source line inversion driving, gate line inversion driving, or dot inversion driving.

6. The liquid crystal display device according to claim 1, wherein the potential changes after the first signal is supplied until the second signal is supplied so that a change in a voltage applied to the liquid crystal layer is reduced.

7. A liquid crystal display device comprising:
a pixel portion including a plurality of pixels each comprising:
a transistor;
a liquid crystal element including a pixel electrode, a common electrode, and a liquid crystal layer over the pixel electrode and the common electrode, wherein a first signal and a second signal having opposite polarities are alternately supplied to the pixel electrode through the transistor, and wherein a fixed potential is supplied to the common electrode; and
a first capacitor including a first electrode and a second electrode; and
a circuit applying a potential to the second electrode, the potential configured to change between a first potential and a second potential after the first signal is supplied until the second signal is supplied,
wherein the pixel electrode and the common electrode partly overlap with each other with an insulating film interposed therebetween, and
wherein the first electrode is electrically connected to the pixel electrode.

8. The liquid crystal display device according to claim 7, wherein the transistor includes an oxide semiconductor film.

9. The liquid crystal display device according to claim 8, wherein the oxide semiconductor film comprises indium, gallium, and zinc.

10. The liquid crystal display device according to claim 7, wherein, as the potential, a potential with triangle waveform is applied to the second electrode.

11. The liquid crystal display device according to claim 7, wherein the first signal and the second signal are configured to be used for one of frame inversion driving, source line inversion driving, gate line inversion driving, or dot inversion driving.

12. The liquid crystal display device according to claim 7, wherein the circuit comprises:
a first switch;
a second switch;
a first resistor;
a second resistor:
a second capacitor;
an amplifier, and
an inverter,
wherein the first switch is configured to be controlled by a signal supplied to a terminal,
wherein the terminal is electrically connected to an input terminal of the inverter,
wherein the second switch is configured to be controlled by a signal at an output terminal of the inverter,
wherein one of terminals of the first switch is electrically connected to one of terminals of the first resistor,
wherein one of terminals of the second switch is electrically connected to one of terminals of the second resistor,
wherein the other of the terminals of the first resistor, the other of the terminals of the second resistor, one electrode of the second capacitor, and a non-inverting input terminal of the amplifier is electrically connected to one another, and wherein an inverting input terminal of the amplifier, an output terminal of the amplifier, and an output terminal of the circuit is electrically connected to one another.

13. The liquid crystal display device according to claim 1, wherein the first signal has a potential higher than the fixed potential, and wherein the second signal has a potential lower than the fixed potential.

14. The liquid crystal display device according to claim 7, wherein the first signal has a potential higher than the fixed potential, and wherein the second signal has a potential lower than the fixed potential.

\* \* \* \* \*